United States Patent
Kuisma et al.

(10) Patent No.: US 11,022,439 B2
(45) Date of Patent: Jun. 1, 2021

(54) SYNCHRONIZED MULTI-AXIS GYROSCOPE

(71) Applicant: MURATA MANUFACTURING CO., LTD., Nagaokakyo (JP)

(72) Inventors: Heikki Kuisma, Helsinki (FI); Anssi Blomqvist, Helsinki (FI); Ville-Pekka Rytkönen, Klaukkala (FI)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 16/708,612

(22) Filed: Dec. 10, 2019

(65) Prior Publication Data
US 2020/0200535 A1    Jun. 25, 2020

(30) Foreign Application Priority Data

Dec. 19, 2018 (FI) ........................ 20186113

(51) Int. Cl.
*G01C 19/5712* (2012.01)

(52) U.S. Cl.
CPC ............... *G01C 19/5712* (2013.01)

(58) Field of Classification Search
CPC ............ G01C 19/5712; G01C 19/574
See application file for complete search history.

(56) References Cited

U.S. PATENT DOCUMENTS

| | | | | |
|---|---|---|---|---|
| 6,520,015 B1 * | 2/2003 | Alause | ......... | G01C 19/574 73/497 |
| 2004/0211258 A1 | 10/2004 | Green | | |
| 2006/0219006 A1 * | 10/2006 | Nasiri | ......... | G01C 19/5712 73/504.12 |
| 2007/0214883 A1 * | 9/2007 | Durante | ......... | G01C 19/5712 73/504.04 |
| 2008/0115579 A1 * | 5/2008 | Seeger | ......... | G01C 19/5719 73/504.12 |
| 2009/0100930 A1 * | 4/2009 | Coronato | ......... | G01P 15/125 73/504.12 |
| 2010/0126269 A1 * | 5/2010 | Coronato | ......... | G01C 19/5712 73/504.04 |

(Continued)

FOREIGN PATENT DOCUMENTS

| | | |
|---|---|---|
| EP | 2 610 588 A2 | 7/2013 |
| JP | 2010-078397 A | 4/2010 |

(Continued)

OTHER PUBLICATIONS

European Search Report dated May 14, 2020 corresponding to European Patent Application No. 19 21 1120.

(Continued)

*Primary Examiner* — David J Bolduc
(74) *Attorney, Agent, or Firm* — Squire Patton Boggs (US) LLP

(57) ABSTRACT

The disclosure relates to a microelectromechanical gyroscope which comprises first and second proof masses which form a first proof mass pair and third and fourth proof masses which form a second proof mass pair. The oscillation of the first and second proof mass pairs is synchronized by a synchronization element which comprises a ringlike body and torsion bars which extend along the x-axis from the ringlike body to the first, second, third and fourth proof masses.

13 Claims, 19 Drawing Sheets

(56) References Cited

U.S. PATENT DOCUMENTS

| | | | |
|---|---|---|---|
| 2010/0126272 A1* | 5/2010 | Coronato | G01C 19/5712 73/504.14 |
| 2010/0236327 A1 | 9/2010 | Mao | |
| 2010/0263446 A1* | 10/2010 | Tamura | G01C 19/5712 73/504.12 |
| 2011/0041609 A1 | 2/2011 | Clark et al. | |
| 2011/0094301 A1* | 4/2011 | Rocchi | G01C 19/574 73/504.08 |
| 2012/0006123 A1* | 1/2012 | Walther | G01C 19/5712 73/774 |
| 2012/0024056 A1* | 2/2012 | Hammer | G01C 19/5712 73/504.02 |
| 2012/0048017 A1 | 3/2012 | Kempe | |
| 2012/0055248 A1* | 3/2012 | Hammer | G01C 19/5755 73/504.12 |
| 2012/0060604 A1* | 3/2012 | Neul | G01C 19/5747 73/504.12 |
| 2013/0167636 A1 | 7/2013 | Coronato et al. | |
| 2013/0192363 A1 | 8/2013 | Loreck et al. | |
| 2014/0182375 A1* | 7/2014 | Kim | G01C 19/56 73/504.12 |
| 2014/0352431 A1* | 12/2014 | Leclerc | G01C 19/5712 73/504.04 |
| 2015/0033850 A1* | 2/2015 | Jeung | G01C 19/56 73/504.12 |
| 2015/0033852 A1* | 2/2015 | Kim | G01C 19/5712 73/504.12 |
| 2015/0128700 A1 | 5/2015 | Neul | |
| 2015/0168441 A1* | 6/2015 | Hutchison | G01P 15/14 356/460 |
| 2015/0377624 A1* | 12/2015 | Falorni | G01C 19/5712 73/504.12 |
| 2016/0178374 A1 | 6/2016 | Kempe | |
| 2016/0231114 A1* | 8/2016 | Kim | G01C 19/5712 |
| 2016/0341552 A1 | 11/2016 | Kub et al. | |
| 2017/0227572 A1 | 8/2017 | Malvern | |
| 2018/0216935 A1* | 8/2018 | Senkal | G01C 19/5747 |
| 2018/0266821 A1 | 9/2018 | Zhang et al. | |
| 2018/0342667 A1 | 11/2018 | Kuisma | |
| 2019/0346265 A1 | 11/2019 | Kuisma | |

FOREIGN PATENT DOCUMENTS

| | | |
|---|---|---|
| JP | 2012-088119 A | 5/2012 |
| JP | 2013-525777 A | 6/2013 |
| JP | 2014-194423 A | 10/2014 |
| WO | WO 2017/130312 A1 | 8/2017 |

OTHER PUBLICATIONS

Finnish Search Report dated May 31, 2019 corresponding to Finnish Patent Application No. 20186113.

Finnish Search Report dated Jun. 5, 2019 corresponding to Finnish Patent Application No. 20186114.

\* cited by examiner

SYNCHRONIZED MULTI-AXIS GYROSCOPE

FIELD OF THE DISCLOSURE

This disclosure relates to microelectromechanical (MEMS) gyroscopes, and more particularly to multi-axis gyroscopes where proof masses may move in the device plane or out of the device plane in their primary and/or secondary oscillation modes. The present disclosure further concerns synchronization structures in such gyroscopes.

BACKGROUND OF THE DISCLOSURE

Microelectromechanical gyroscopes use the Coriolis effect to measure angular velocity. In oscillating MEMS gyroscopes, an object is driven into oscillating movement by an actuating drive force. This oscillation will be called "primary oscillation" or "drive oscillation" in this disclosure, and the oscillation mode will be labelled called the "primary oscillation mode". It may also be labelled the primary resonance mode since mechanical resonance of a mass-suspension system is often used to increase the amplitude of the primary oscillation. In MEMS gyroscopes the drive oscillation can involve linear or rotational oscillation of a solid proof mass.

MEMS gyroscopes typically comprise partly mobile proof masses which are driven into either linear or rotational oscillating motion, or a combination of these two motions. In multi-axis MEMS gyroscopes, the primary oscillation induced by drive transducers can be configured to occur either in the device plane or out of the device plane.

If the gyroscope undergoes angular rotation, the Coriolis force generates a secondary oscillation mode in the oscillating object. This oscillation will be called "secondary oscillation" or "sense oscillation" in this disclosure. It may also be labelled the "secondary resonance mode" since mechanical resonance of a mass-suspension system is often used to increase the amplitude of the secondary oscillation. The direction of the secondary oscillation induced by the Coriolis force is perpendicular both to the direction of the primary oscillation and to the direction of the rotation axis. The amplitude of the secondary oscillation is proportional to the amplitude of the primary oscillation and to the angular rotation rate. A sensor, or sense transducer, can be used to measure this amplitude, and the magnitude of the angular rotation rate can be determined from the resulting sense signal.

The partly mobile proof masses, which constitute the rotation-sensitive elements of the gyroscope, may be suspended from a fixed structure by suspenders which are configured to flexibly allow oscillating primary motion and secondary motion at a desired resonant frequency. The net reaction force and torque of the primary oscillation mode and secondary oscillation mode should preferably be zero, so that kinetic energy does not leak from these desired oscillation modes and external vibrations do not couple to them.

Proof masses may be prone to undesired oscillatory movement when external vibrations or shocks act on the gyroscope. Such external vibrations can cause disturbances in the angular rate measurement due to overloading of the transducers and/or amplifiers used for obtaining electrical signals. External vibrations may couple to the desired oscillation modes via small asymmetries due to the limits set by manufacturing tolerances for the mechanical structures, and/or for electrical transducers, and/or for the differential amplifiers used for signal amplification.

It is known that a gyroscope where a pair of interconnected proof masses is synchronized to continuously oscillate in opposite directions is less vulnerable to disturbances caused by external vibrations than gyroscopes with only one oscillating proof mass. With suitable measurement arrangements, the effect of disturbances caused by linear vibration can be automatically cancelled by reading the measurement signal from the proof mass pair in a differential manner. It is also known that additional robustness can be achieved with a second pair of proof masses which oscillates in anti-phase with the first, since also disturbances caused by angular vibrations will be cancelled.

Simultaneous oscillation in opposite (linear or rotational) direction may be called anti-phase oscillation. Simultaneous oscillation in the same direction may be called cophasal oscillation.

Proof masses should preferably be suspended from fixed structures with suspension arrangements which are suitably flexible for the desired primary and secondary oscillation modes, so that desired resonant frequencies are achieved for the desired modes. The suspension arrangement should also resist undesired oscillation modes by being considerably stiffer for them than for the desired oscillation modes, thus bringing the undesired resonant frequencies above the frequency range of disturbing external vibrations, e.g. above 50 kHz in automotive applications. Furthermore, the oscillation of multiple, differentially measured proof masses should preferably be synchronized by a synchronization structure, which may be a part of the suspension structure specifically dedicated to promoting anti-phase oscillation and resisting cophasal oscillation.

A multi-axis gyroscope may be created by including two or more single axis gyroscopes for different axes, each with a different oscillation frequency, in one device. This will pose a difficulty for the electronics. Multiple sustaining and stabilizing circuits for the primary oscillation are needed, possible interference of the oscillation frequencies will cause undesired effects, and the area of the gyroscope will be relatively large, since up to 12 proof masses are needed for a robust three-axis operation. It is therefore desirable to design a multiaxis gyroscope with only one oscillating frequency for the whole set of proof masses.

A general problem in multiaxis gyroscopes with one oscillation frequency is that the desired primary and secondary oscillation modes of each proof mass comprise a multitude of different oscillations, some of which occur in the device plane and some out of the device plane. Correspondingly, external vibrations in any direction may induce undesired cophasal oscillation. Proof mass arrangements and suspension arrangements with sufficient mobility for the desired oscillation directions and phases, and sufficient rigidity for the undesired oscillation directions and phases, can be complicated.

Document US2013167636 discloses a multiaxis gyroscope with a complex proof mass arrangement of eight proof masses which includes separate X-Y proof masses a Z proof masses and a network of suspenders which interconnect the proof masses. Still it doesn't achieve robustness to external angular vibrations about any of the axes. Simpler devices would be desirable with better robustness.

Document WO2017130312 discloses a gyroscope with a ring-shaped central suspender. It is only applicable for measuring angular rotation about the z-axis which is perpendicular to the device substrate. It is not a multiaxis gyroscope.

BRIEF DESCRIPTION OF THE DISCLOSURE

An object of the present disclosure is to provide a multiaxis gyroscope with a simple but robust structure which facilitates reliable operation and high accuracy.

The object of the disclosure is achieved by an arrangement which is characterized by what is stated in the independent claim. The preferred embodiments of the disclosure are disclosed in the dependent claims.

The disclosure is based on the idea of synchronizing the oscillation of two proof mass pairs with a ringlike body which interconnects the pairs a central symmetry point. An advantage of the arrangement described in this disclosure is that, with suitable suspensions and connections between the synchronization element and the surrounding proof mass, the element can flexibly allow desired anti-phase oscillation modes and resist undesired cophasal oscillation modes.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1A:
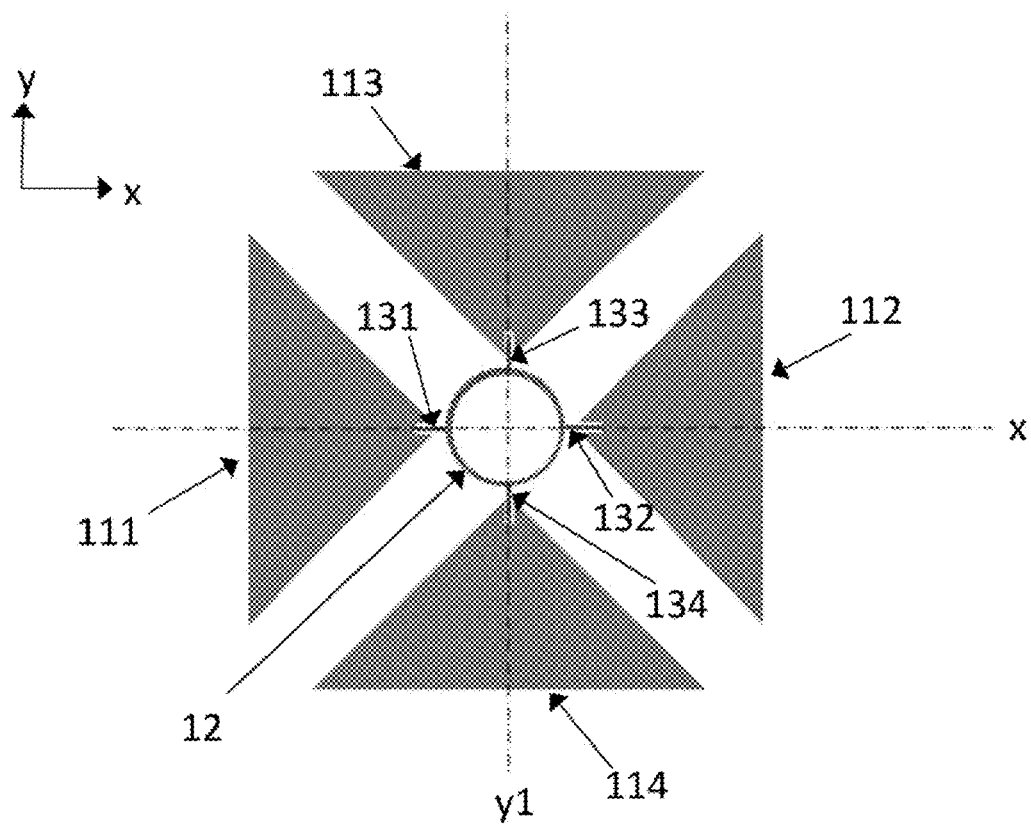
FIGS. 1a-1f illustrate gyroscopes with four proof masses and a synchronization element.

In this disclosure, expressions such as "orthogonal", "parallel" and "symmetrical" are used to refer to orientations and distributions which should ideally be perfectly orthogonal/parallel/symmetrical. Nevertheless, slight deviations from perfect orthogonality, parallelity and symmetry are possible and to some extent unavoidable due to limitations in manufacturing accuracy. The person skilled in the art will understand that the same technical effect can usually be obtained even if the orientation or distribution deviates to some extent from orthogonality/parallelity/symmetry.

In this disclosure, the term "horizontal" refers to orientations that lie in the xy-plane illustrated in the figures. The horizontal xy-plane corresponds to the "device plane" defined by the surface of the substrate where the partly mobile elements of the gyroscope are formed. The partly mobile elements of the gyroscope typically lie in the device plane in their rest position, before they are moved by a driving force or the Coriolis force. The device plane may also be called the substrate plane.

The term "vertical" refers to the z-direction, which is perpendicular to the horizontal plane. Terms such as "vertical" and "horizontal" do not imply anything about the orientation of the substrate when the device is manufactured, or when the device is in use. The device and the substrate may be oriented in any suitable direction during usage and manufacturing, for example sideways in such a manner that a plane which is in this disclosure referred to as "horizontal" becomes a vertical surface. In other words, the terms "horizontal" and "vertical" merely define two orthogonal directions, one of which is parallel to a substrate surface, and the other of which is normal to that surface.

Terms such as "upper" and "lower" refer to the relative placement of elements in the figures, so that an element placed closer to the upper part of the figure may be called an upper element, while the corresponding element closer to the lower part of the figure may be called a lower element.

Furthermore, linear and/or rotational motion where the proof mass remains level in the device plane may referred to as "in-plane" motion or "motion in the device plane", while linear and/or rotational motion where the proof mass (or its center of gravity) moves in a vertical direction may be referred to as "out-of-plane" motion, or "motion out of the device plane".

Saying that a suspender or set of suspenders prevents or resists a movement or an oscillation mode signifies that the spring constant produced by the suspenders for this mode is much larger than that of the desired movement or oscillation and thus the corresponding resonant frequency of the "prevented" or "resisted" mode is much higher than that of the desired mode.

This disclosure describes a microelectromechanical gyroscope which comprises first and second proof masses which form a first proof mass pair which in its rest position is aligned on an x-axis in the device plane, and third and fourth proof masses which form a second proof mass pair which in its rest position is aligned on a y1-axis in the device plane. The first and second proof mass pairs in their rest positions form a symmetrical mass distribution in relation to a first center point where the x-axis crosses the y1-axis orthogonally, and where a vertical z1-axis crosses both the x-axis and the y1-axis orthogonally.

The gyroscope comprises a fixed support with one or more anchor points, one or more drive transducers and one or more sense transducers. The gyroscope comprises suspenders which suspend the first and second proof mass pairs from the one or more anchor points so that they allow the first and second proof mass pairs to oscillate in a primary oscillation mode initiated and sustained by the one or more drive transducers, and in any of three secondary oscillation modes generated by the Coriolis effect. The one or more sense transducers are configured to measure the magnitude of the three secondary oscillation modes.

The primary oscillation mode of the first and second proof mass pairs may be one of a first mode and a second mode.

The first mode comprises oscillation where the first proof mass pair moves in the device plane in a first rotational oscillation around the z1-axis, and the second proof mass pair simultaneously moves in the device plane in a second rotational oscillation around the z1-axis, so that the first proof mass pair and second proof mass pair oscillate around the z1-axis in anti-phase, always in opposite rotational directions.

The second mode comprises oscillation where the first proof mass pair moves in the device plane in a first linear oscillation along the x-axis, so that both proof masses in the first proof mass pair move towards and away from the first center point simultaneously, and the second proof mass pair moves in the device plane in a second linear oscillation along the y1-axis, so that both proof masses in the second proof mass pair move towards and away from the first center point simultaneously, and where the first proof mass pair and second proof mass pair oscillate in anti-phase, so that the first proof mass pair moves towards the first center point when the second proof mass pair moves away from it and vice versa.

The three secondary oscillation modes of the first and second proof mass pairs include a z1-axis secondary mode, an x-axis secondary mode, and a y-axis secondary mode.

In response to rotation of the gyroscope about the z-axis, the z1-axis secondary mode is the second mode if the primary oscillation mode is the first mode, and the z1-axis secondary mode is the first mode if the primary oscillation mode is the second mode.

In response to rotation of the gyroscope about the x-axis, the x-axis secondary mode comprises oscillation where the first proof mass pair rotates out of the device plane about the y1-axis if the primary oscillation is the first mode, and the x-axis secondary mode comprises oscillation where the second proof mass pair rotates out of the device plane about the x-axis if the primary oscillation is the second mode, In response to rotation of the gyroscope about the y-axis, the y-axis secondary mode comprises oscillation where the second proof mass pair rotates out of the device plane about the x-axis if the primary oscillation is the first mode, and the y-axis secondary mode comprises oscillation where the first proof mass pair rotates out of the device plane about the y1-axis if the primary oscillation is the second mode.

The oscillation of the first and second proof mass pairs is synchronized by a first synchronization element which comprises a first ringlike body centered around the first center point in the device plane, and first and second x-axis torsion bars which extend along the x-axis from the first ringlike body to the first and second proof masses which form the first proof mass pair, and first and second y-axis torsion bars which extend along the y1-axis from the first ringlike body to the third and fourth proof masses which form the second proof mass pair.

FIG. 1a illustrates a gyroscope with first and second proof masses 111 and 112, which form a first proof mass pair, and third and fourth proof masses 113 and 114, which form a second proof mass pair. The first proof mass pair is aligned on the x-axis. In this disclosure, a body is aligned on an axis if its center of gravity in the device plane lies on that axis. The second proof mass pair is aligned on the y1-axis.

In the embodiments presented below, this disclosure also makes reference to two other y-axes, the y2-axis and the y3-axis. The symmetry and movements of the gyroscope are defined with reference to these parallel axes. Rotation of the gyroscope about any axis parallel to the y1-, y2- and y3-axes is referred to as "rotation about the y-axis".

The first center point of the gyroscope lies at the point where the y1-axis crosses the x-axis. As seen in FIG. 1a, the mass distribution around the first center point is symmetrical.

Proof masses 111-114 have been illustrated as triangular proof masses in FIG. 1a, with a right-angle at the corner which is closest to the first center point if the gyroscope. However, the proof masses may also have any other suitable shape. The fixed support of the gyroscope has not been illustrated in FIG. 1a.

The suspenders which support the weight of the proof masses include a central suspension arrangement formed by a synchronization element around the a center point, and peripheral suspension arrangements which support the weight of the proof masses closer to the periphery of the gyroscope. No peripheral suspenders have been illustrated in FIG. 1a. Any peripheral suspenders which flexibly allow the desired oscillation modes can be used, and their shape may depend on the shape of the proof masses.

The peripheral suspenders may not necessarily rigidly resist undesired oscillation modes, since this function is performed by the first synchronization element. The design of the peripheral suspenders may instead be optimized to meet other constraints, such as integration with drive and sense transducers. Drive and sense transducers have not been illustrated in FIG. 1a. Exemplary arrangements for organizing peripheral suspenders and transducers suitable for obtaining the desired oscillation modes will be described in embodiments presented below.

The first synchronization element comprises a ringlike body 12, first and second x-axis torsion bars 132 and 132, and first and second y-axis torsion bars 133 and 134. In this disclosure, the term "ringlike" may refer to a circular ring, such as the one illustrated in FIG. 1a. The ring can undergo elliptical deformation when the surrounding proof mass pairs oscillate towards and away from the first center point in anti-phase, as described in more detail below. The term "ringlike" may also refer to an approximately circular element, for example a regular polygon such as an octagon or hexadecagon, where one corner of the polygon is placed at the point where one torsion bar is attached to the ringlike body. A ringlike body shaped like such a regular polygon may undergo quasi-elliptical deformation under the desired oscillation modes described above.

The term "ringlike" may also refer to a diamond shape where the torsion bars are attached to the corners of the diamond, or to a four-pointed star shape where the torsion bars are attached to the points of the star. The term "ringlike" may also refer to a polygon, diamond or star shape where at least some of the corners are rounded. In general, the term "ringlike" may refer to any closed shape that will under an in-plane force easily contract on x- and y1-axes with a matching forced expansion on an orthogonal y1- or x-axis so that the net area change of the pattern is essentially zero and there is negligible corresponding forced linear deformation along axes rotated 45 degrees from x- and y1-axes and going through the center point. Furthermore, in order to synchronize out-of-plane oscillation the closed shape should be sufficiently thick in the vertical direction and have a suitable shape to remain at least approximately planar as the attached proof masses undergo out-of-plane movement and create bending moments to the ringlike body that primarily should tilt it but not bend it, as described in more detail below.

To facilitate elliptical or quasi-elliptical deformation, the ringlike body should preferably in its rest position be symmetrical in relation to the first center point of the gyroscope. The ringlike body should also be sufficiently narrow to exhibit spring constants of suitable magnitude in elliptical deformation. This magnitude will depend on the size of the proof masses 111-114 and the magnitude of the driving forces by which there are actuated into primary oscillation.

Similarly, torsion bars 131-134 should be sufficiently narrow to twist around their longitudinal axis when one proof mass pair tilts out of the device plane. The optimal length and breadth of the torsion bars will also depend on the size of the proof masses and the magnitude of the forces by which the masses are driven in their primary oscillation mode. As described in more detail below, the primary oscillation mode may require in-plane bending in torsion bars 131-134, which should also be taken into account in the dimensioning of the torsion bars.

As presented in more detail below, the torsion bars should have high enough out-of-plane rigidity for bending so that they and the ringlike body will rigidly connect the mass pairs for out-of-plane movement. A suitable shape for the torsion bars 131-134 may be a bar with a rectangular cross section with large height-to-breadth ratio and high length-to-breadth ratio and length-to-depth ratio larger than one. Depending on the manufacturing technology, the height-to-breadth ratio may be on the order of 10 or even larger.

Figure 1B:
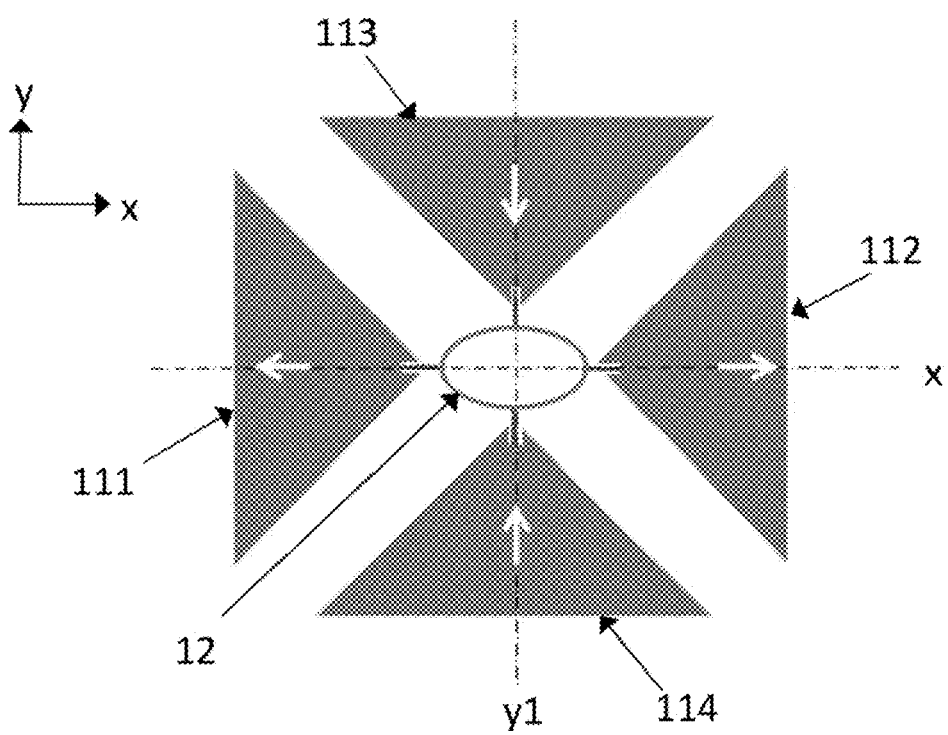

The first and second desired oscillation modes of the gyroscope, and the synchronizing function of the ringlike body and the torsion bars in these oscillation modes, will be described next. FIG. 1b illustrates the oscillation mode which was labelled the second mode above. The second mode maybe either a drive oscillation mode or a sense oscillation mode. In this mode, the first proof mass pair moves in linear translation toward the first center point at the same time as the second proof mass pair moves in linear translation away from the first center point, and vice versa.

In the oscillation phase illustrated in FIG. 1b, the first proof mass pair 111-112 has moved away from the center point and the second proof mass pair 113-114 has moved towards the center point. The ringlike body flexibly assumes the shape of an ellipse with a greater radius in the direction of the x-axis than in the direction of the y1-axis. In the opposite phase of the oscillation cycle, the ringlike body assumes the shape of an ellipse with a greater radius in the direction of the y1-axis than in the direction of the x-axis.

The ringlike body thereby flexibly accommodates the second mode, and the elastic energy absorbed/imparted by the ringlike body from/to the two proof mass pairs serves to maintain their synchronized anti-phase oscillation in this second mode. The ringlike body prevents cophasal in-plane movement of the proof mass pairs since it would require contraction and expansion of the whole ring, for which the ring is inflexible since it will require higher order deformation of the ringlike body to a shape where there is corresponding expansion and contraction in directions rotated by 45 degrees from the x- and y1-axes. The unsupported ringlike body doesn't prevent cophasal movement of the two masses of each pair, which has to be prevented by other means that will be presented below.

Figure 1C:
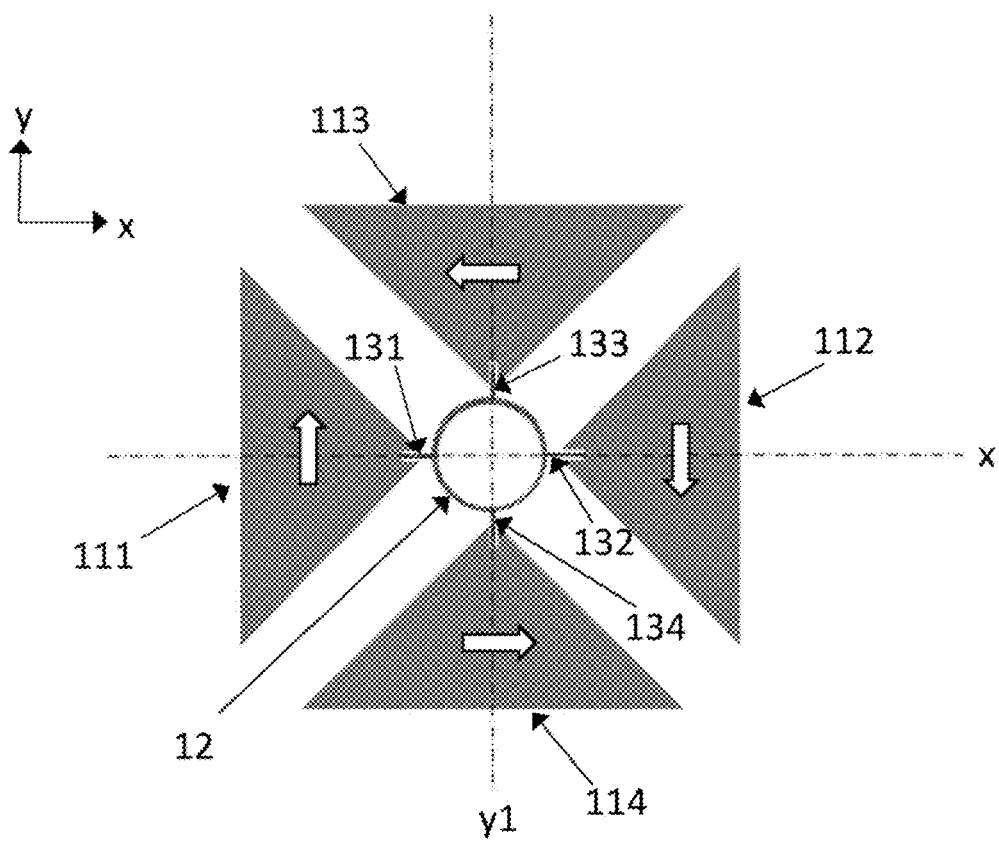

FIG. 1c illustrates the oscillation mode which was labelled the first mode above. In this mode, each proof mass 111-114 undergoes rotation about an axis located somewhere near the mid-point of a corresponding torsion bar 131-134. Depending on the suspension and actuation geometry which is used for driving the primary oscillation, the movement of the proof mass may be a combination of linear translation and rotation. Each torsion bar bends slightly in the device plane to accommodate the rotational movement of the proof mass. This bending is not illustrated. Even though the proof masses do not rotate about the z1-axis which crosses the first gyroscope center point, but instead rotate around adjacent axes parallel to the z1-axis, the direction of rotation can nevertheless be described in relation to the z-axis. For example, in FIG. 1c the first proof mass pair 111-112 rotates in a clockwise direction around the z1-axis, while the second proof mass pair 113-114 rotates in a counter-clockwise direction around the z1-axis.

Deformation of the ringlike body is prevented in the first oscillation mode by diagonal suspenders or by a combination of anchored and mobile torsion bars as discussed below. This restriction leaves the first oscillation mode unsynchronized by the ringlike body and synchronization must be accomplished by additional synchronization elements that will be presented below.

The undesired cophasal oscillation modes which the synchronization element should preferably resist include a mode where both masses in one proof mass pair simultaneously move in the same direction (for example, masses 111 and 112 simultaneously moving left in FIG. 1b) or where both proof mass pairs move cophasal. Such vibrations can be induced in the proof mass system if the gyroscope undergoes a sudden acceleration or vibration in the direction of either the x-axis or the y-axis or a sudden rotation or angular vibration about the z-axis. The ringlike body doesn't prevent these modes and they must be prevented by other means that will be presented below.

When it is anchored in a suitable way, the ringlike body 12 will effectively resist the undesired in-plane oscillation modes mentioned above. The anchoring should be constructed in such a way that the ring can flexibly assume elliptical shapes around the first center point of the gyroscope, but linear translation and non-elliptical deformations are prevented. Exemplary anchoring arrangements for achieving these goals, and for preventing undesired in-plane and out-of-plane oscillation modes as well, will be presented below.

Figure 1D:
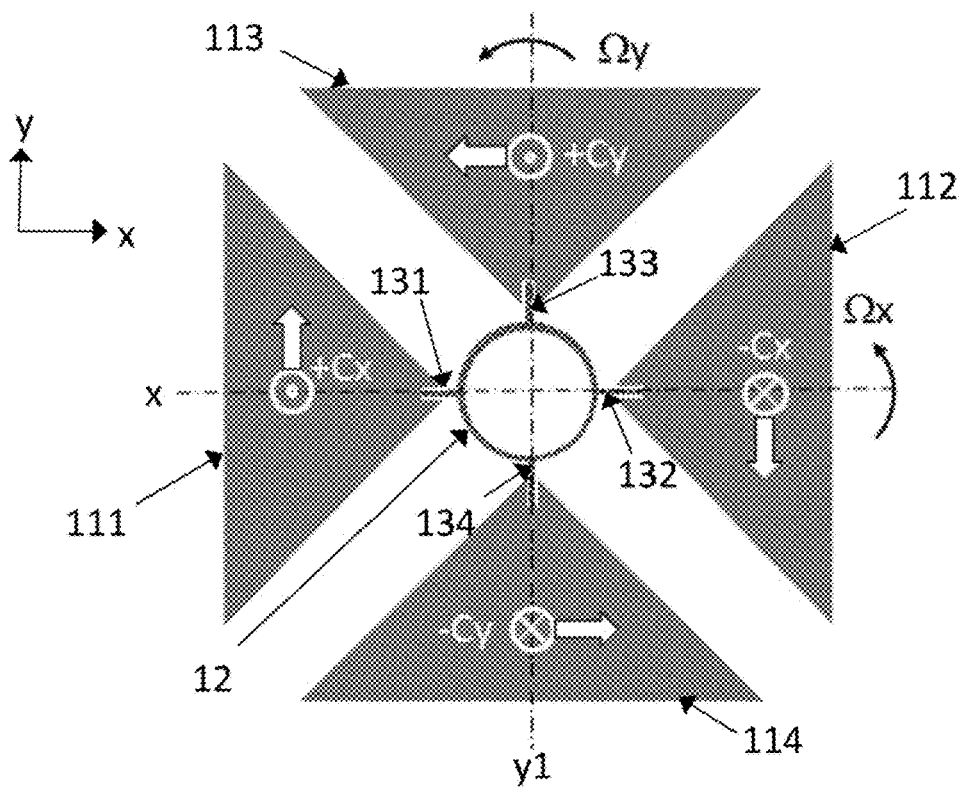

FIG. 1d illustrates the two out-of-plane secondary oscillation modes, which were labelled the x-axis secondary mode and the y-axis secondary mode above. FIG. 1d illustrates a situation where the primary oscillation mode is the first mode, as indicated by the white arrows. If the gyroscope undergoes angular rotation $\Omega x$ about the x-axis, a corresponding Coriolis force Cx will move the proof masses 111 and 112 in the first proof mass pair out of the device plane. In the illustrated phase of primary oscillation, the Coriolis force acts upward on proof mass 111 (illustrated by +Cx and circled dot), but downward on proof mass 112 (illustrated by −Cx and circled cross). The third and fourth proof masses 113 and 114 will be almost unaffected by Cx since their oscillating motion is almost parallel to the x-axis. However, proof masses 113 and 114 will experience torque induced by $\Omega x$ about the y1-axis, the effect of which will be prevented by other means that will be presented below.

The corresponding situation is obtained if the gyroscope undergoes angular rotation $\Omega y$ about the y-axis. The Coriolis force Cy will move the proof masses 113 and 114 in the second proof mass pair out of the device plane, while the first proof mass pair is unaffected by Cy. Again, the proof masses 111 and 112 will experience torque about the x-axis, the effect of which will be prevented by other means that will be presented below. Both angular rotations $\Omega x$ and $\Omega y$ (and consequent proof mass oscillations) illustrated in FIG. 1d can occur and be measured simultaneously, but they may of course also occur and be measured in isolation, so that one of them is present but the other is not.

Figure 1E:
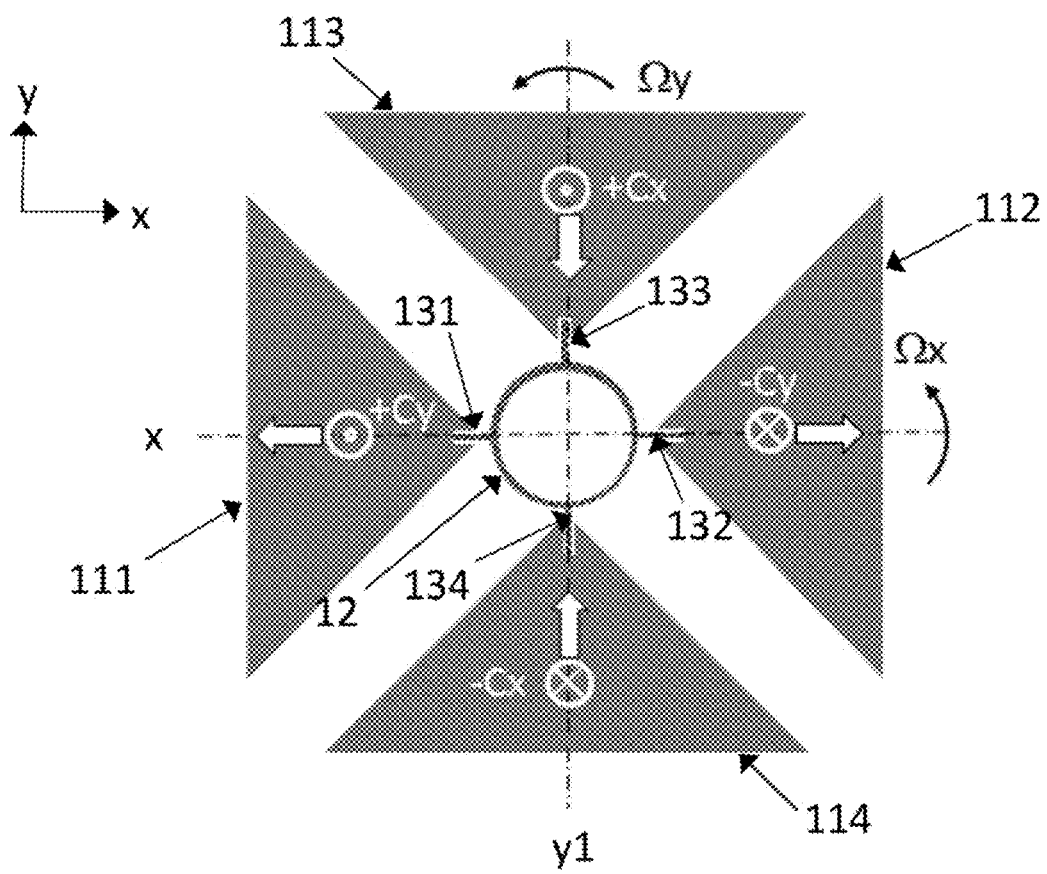

FIG. 1e illustrates the alternative x-axis secondary mode and y-axis secondary mode which will occur if the primary oscillation mode is the second mode, as indicated by the white arrows. In this case, if the gyroscope undergoes angular rotation $\Omega x$ about the x-axis, a corresponding Coriolis force Cx will move the proof masses 113 and 114 in the second proof mass pair out of the device plane, while the first and second proof masses 111 and 112 will be unaffected by Cx since their oscillating motion is parallel to the x-axis. However, proof masses 111 and 112 will experience torque induced by $\Omega x$ about x-axis, the effect of which will be prevented by other means that will be presented below. Correspondingly, if the gyroscope undergoes angular rotation $\Omega y$ about the y-axis, the Coriolis force Cy will now move the proof masses 111 and 112 in the first proof mass pair out of the device plane, while the second proof mass pair is unaffected by Cy. Again, the proof masses 113 and 114 will experience torque about y1-axis, the effect of which will be prevented by other means that will be presented below.

Figure 1F:
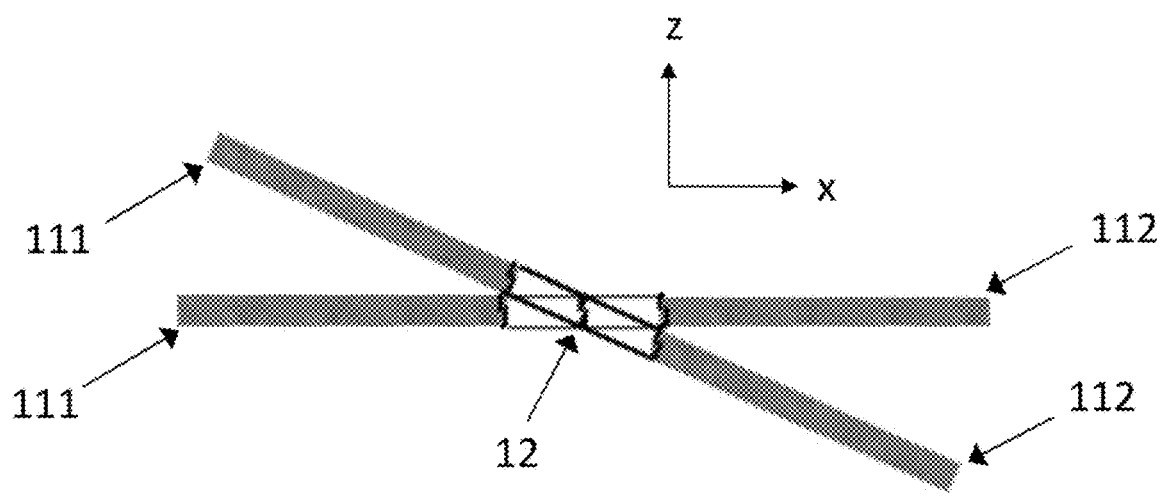

FIG. 1f illustrates the out-of-plane oscillation of the first proof mass pair 111-112. The proof mass pair is shown in its rest position in the xy-plane, and in a position where it has moved out of the xy-plane. As the proof mass pair moves out of the device plane, the ringlike body and the torsion bars also rotate out of the device plane. The illustrated out-of-plane oscillation is accommodated by the y-axis torsion bars 133 and 134, while the x-axis torsion bars transmit the out-of-plane force from proof masses 111 and 112 to the ringlike body 12.

Similarly, the out-of-plane oscillation of the second proof mass pair is accommodated by the x-axis torsion bars 131 and 132, while the y-axis torsion bars in this case transmit out-of-plane forces to the ringlike body. If the gyroscope simultaneously undergoes rotation about both the x-axis and the y1-axis, so that both the first and the second proof mass pairs move out of the device plane, then the ringlike body can undergo tilting motion which is a combination of x-axis tilting and y1-axis tilting.

The torsion bars should preferably be dimensioned so that they can flexibly absorb the twisting forces imparted to them by the out-of-plane motion that proof mass pair to which they are not attached (for example, torsion bars 133 and 134 should flexibly absorb the forces imparted to them by the out-of-plane motion of the first proof mass pair 111-112), but rigidly transmit to the ringlike body the tilting forces imparted to them by the out-of-plane motion of that proof mass pair to which they are attached. If that design objective can be achieved, the ringlike body and the torsion bars will then mostly retain its planarity even when it is tilted about both the x-axis and the y1-axis simultaneously. However, the torsion bars and the ringlike body can never be infinitely rigid. Some bending may occur when the proof mass pairs effectively experience out-of-plane rotation about x- or y1-axis.

Central Suspension Arrangements

Figure 2A:
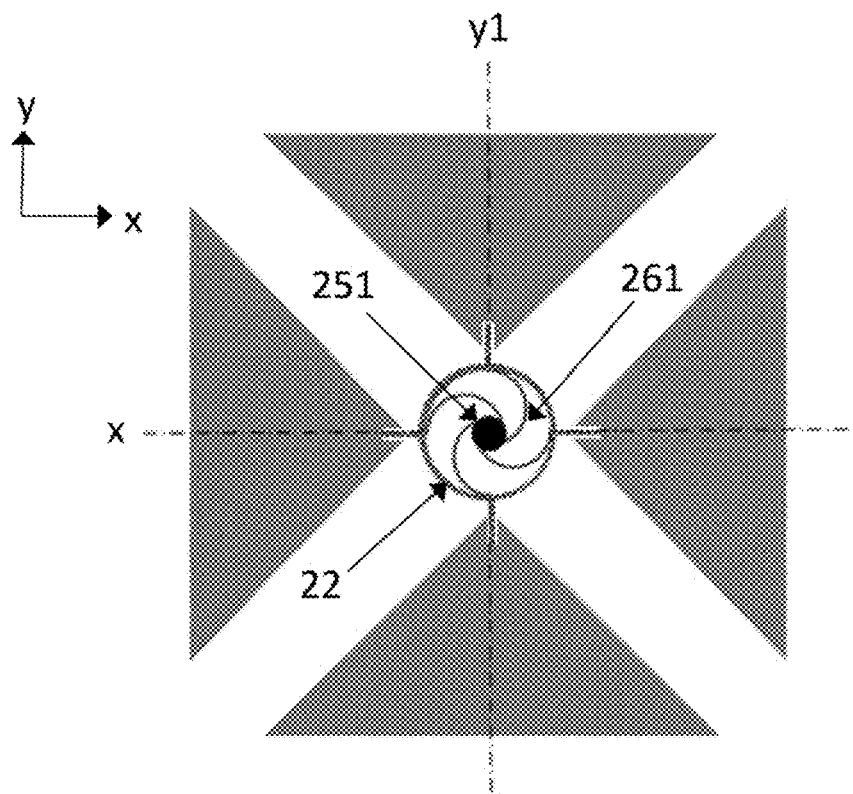
FIGS. 2a-2b illustrate anchoring of a synchronization element.

The one or more anchor points in the gyroscope may comprise central anchor points located at the center points. The synchronization element may also comprise three or more curved suspenders in the device plane, which extend from the central anchor point to the ringlike body. FIG. 2a illustrates a gyroscope with the proof mass pairs and the synchronization element 22 described above. The gyroscope comprises a central anchor point 251 located at the first center point of the gyroscope. The gyroscope also comprises four curved suspenders 261. Curved suspenders 261 may be semicircular, have a form of an elliptic arc or they may consist of straight sections like two orthogonal straight bars. Curved suspenders 261 connected to the synchronization element 22 and to the central anchor 251 will allow tilting of the synchronization element about the x- and y1-axes, but it prevents linear out-of-plane movement of the synchronization element 22. Thus, it will prevent cophasal out-of-plane motion of both proof mass pairs.

Figure 2B:
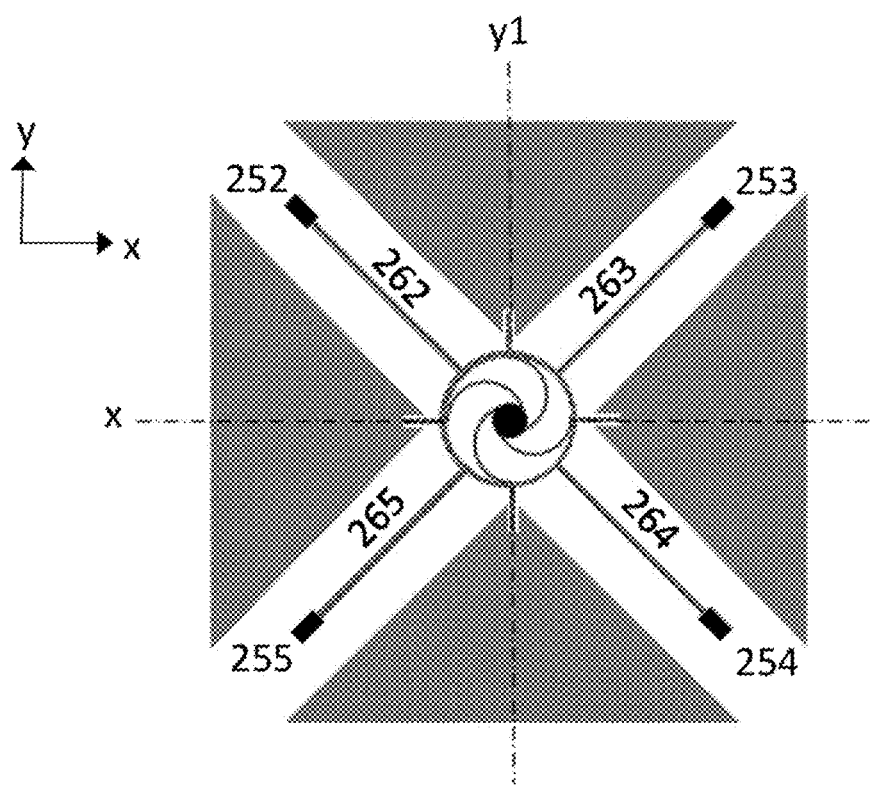

The central suspension arrangement of this gyroscope thereby comprises suspenders 261 which extend from the central anchoring point 251 to the ringlike body 22, and torsion bars which extend from the ringlike body 22 to the proof masses. FIG. 2b illustrates an additional central suspension arrangement where the one or more anchor points comprise four diagonal anchor points 252-255 located between one proof mass from the first proof mass pair and one proof mass from the second proof mass pair, so that there is one diagonal anchor point between each proof mass from the first proof mass pair and each proof mass from the second proof mass pair. In this case the central suspension arrangement also comprises four diagonal suspenders 262-265 in the device plane. Each diagonal suspender 262-265 extends from a diagonal anchor point 252-255 to the ringlike body, and each diagonal suspender is oriented at an angle of 45° in relation to both the x-axis and the y-axis.

The diagonal suspenders 262-265 may bend into an S-shape form in out-of-plane direction and simultaneously twist when one proof mass pair undergoes out-of-plane oscillation and the ringlike body moves out of the device plane in a tilting manner. The diagonal suspenders will prevent the in-plane linear movement of the ringlike body and thus prevent all cophasal in-plane movement of the proof masses in both x- and y-directions.

Figure 3A:
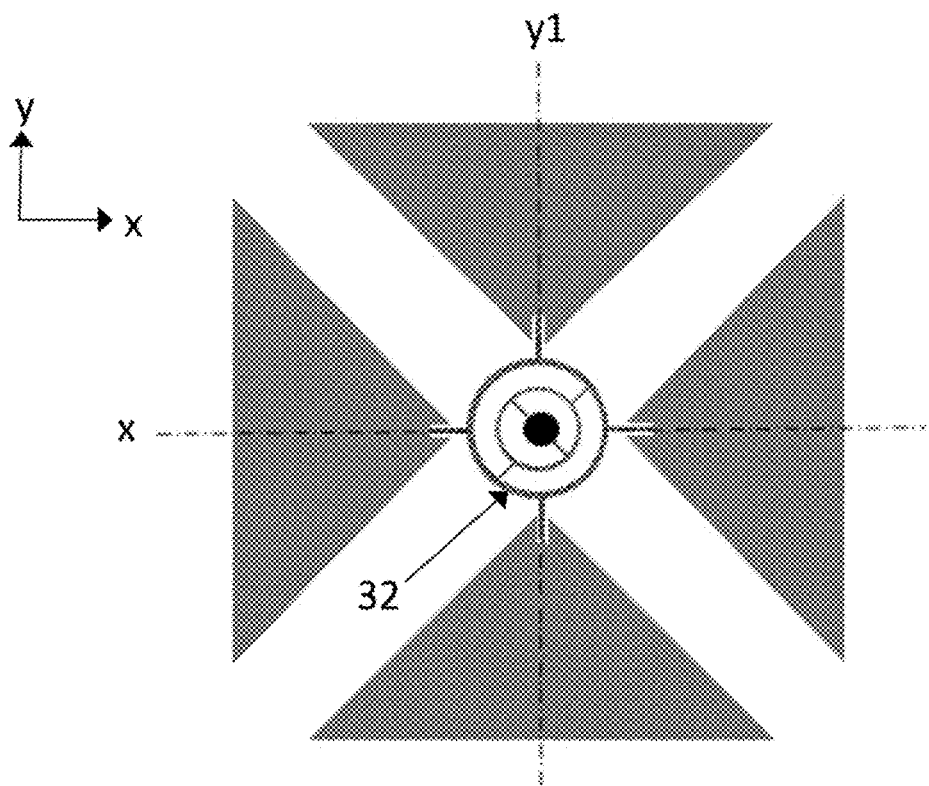
FIG. 3a-3d illustrate central suspension arrangements based on gimbal structures.

FIG. 3a illustrates an alternative central suspension arrangement based on a gimbal structure within the ringlike body 32. It replaces both the curved suspenders and the diagonal suspenders and provides all the functions that they provide: flexibility for the ringlike body to deform to an elliptic shape, flexibility for out-of-plane tilting of the ringlike body and pairs of proof masses, prevention of out-of-plane cophasal movement of the proof masses and prevention of in-plane cophasal movement of the proof masses.

Figure 3B:
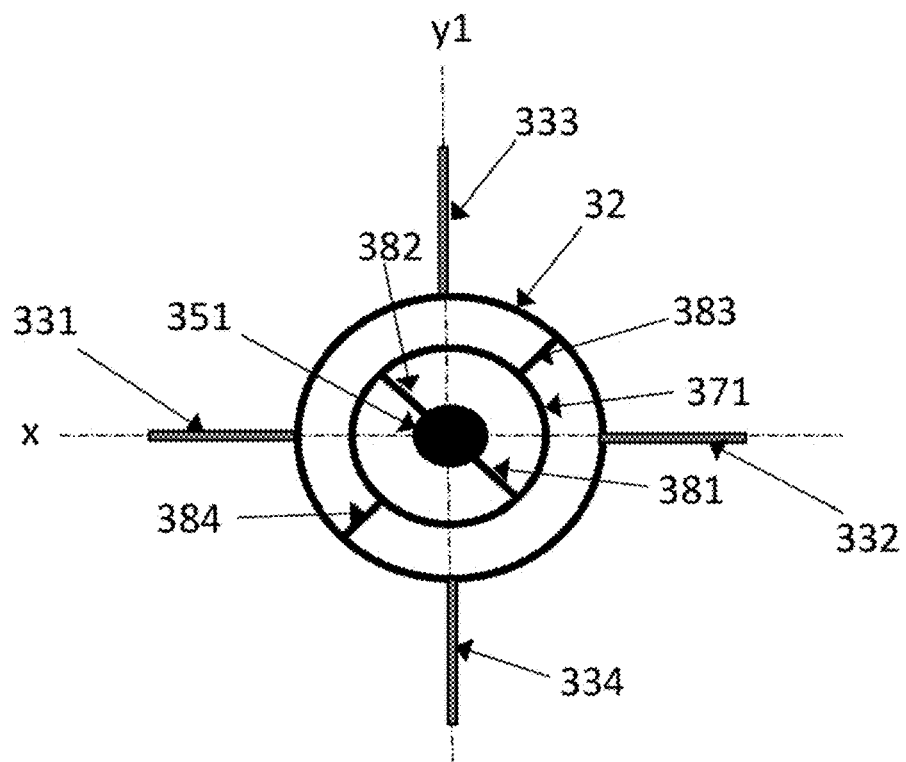

FIG. 3b shows the gimbal structure in more detail. Reference numbers 32 and 331-334 correspond to reference numbers 12 and 131-134 in FIGS. 1a-1f. It is centered on the central anchor point 351 and comprises a gimbal frame 371 which is concentric with the ringlike body 32. The gimbal structure also comprises two anchored torsion bars 381 and 382 which extend from the central anchor point 351 to the gimbal frame 371. The two anchored torsion bars 381 and 382 are oriented at an angle of 45° in relation to both the x-axis and the y-axis. The gimbal structure also comprises two mobile torsion bars 383 and 384 which extend from the gimbal frame 371 to the corresponding ringlike body 32. The two mobile torsion bars 383 and 384 are orthogonal to the anchored torsion bars 381 and 382.

Figure 3C:
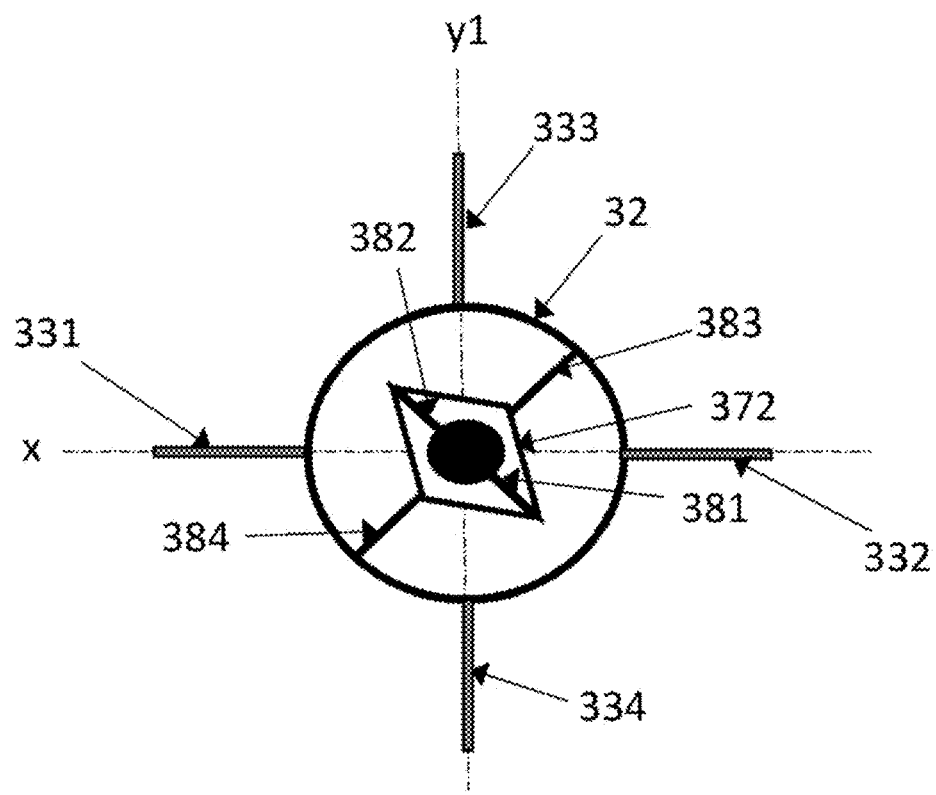
Figure 3D:
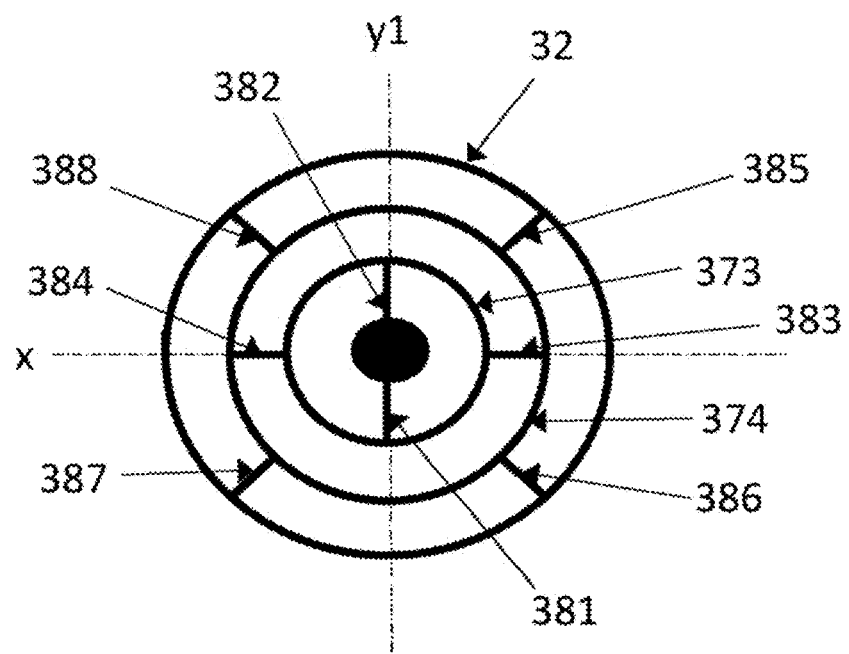

In FIGS. 3a and 3b, the gimbal frame 371 has the shape of a ring. Alternatively, the gimbal frame may have a diamond shape, as illustrated in FIG. 3c, ellipse shape, rectangular shape or any other closed shape. FIG. 3d illustrates an alternative gimbal structure. The x-axis torsion bars 331-332 and y-axis torsion bars 333-334 have been omitted from FIG. 3d for clarity reasons. The illustrated gimbal structure comprises an inner gimbal frame 373, an outer gimbal frame 374, both of which are concentric with the ringlike body 32, and two anchored torsion bars 381 and 382, both of which extend along the y-axis from the central anchor point to the inner gimbal frame 373. The gimbal structure also comprises two inner mobile torsion bars 383 and 384 which extend from the inner gimbal frame 373 to the outer gimbal frame 374. The two inner mobile torsion bars 383 and 384 are orthogonal to the anchored torsion bars 381 and 382. The gimbal structure further comprises four outer mobile torsion bars 385-388 which extend from the outer gimbal frame 374 to the ringlike body 32. The four outer mobile torsion bars 385-388 are oriented at an angle of 45° in relation to both the x-axis and the y-axis. The anchored torsion bars 381 and 382 could alternatively be oriented along the x-axis, and inner mobile torsion bars 383 and 384 would in that case be oriented along the y1-axis.

Peripheral Suspension and Anchoring

Figure 4:
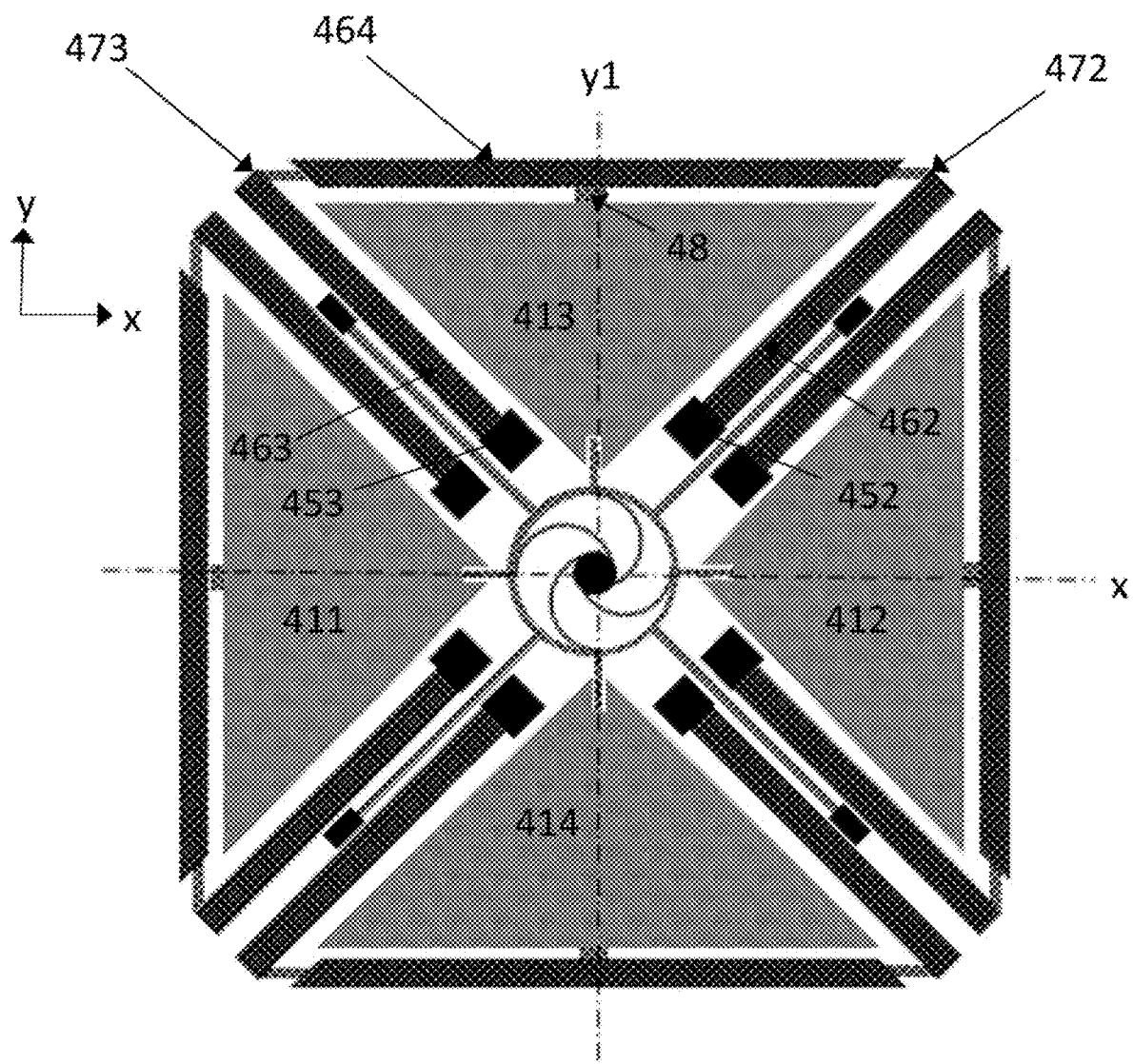
FIGS. 4-5 illustrate peripheral suspension arrangements.

FIG. 4 illustrates an exemplary peripheral suspension arrangement where reference numbers 411-414 correspond to reference numbers 111-114 in FIGS. 1a-1e. The one or more anchor points comprise two peripheral anchor points 452 and 453 on opposite sides of the central corner of each proof mass, such as 413. Each proof mass is suspended from said peripheral anchor points 452 and 453 by a peripheral suspender which has the shape of a truncated isosceles triangle which partially surrounds the proof mass. A first leg of 462 the peripheral suspender extends from one peripheral anchor point 452 past a first side of the proof mass to a first corner point 472 on the additional peripheral suspender, and a second leg 463 of the peripheral suspender extends from the other peripheral anchor point 453 past a second side of the corresponding proof mass 413 to a second corner point 473 on the peripheral suspender. The base 464 of the peripheral suspender, which joins together the first leg 462 and the second leg 463, extends from the first corner point 472 to the second corner point 473 past a third side of the corresponding proof mass. The base of the peripheral suspender is attached to the third side of the corresponding proof mass with a connector 48 aligned on the same axis as the proof mass.

The peripheral suspension illustrated in FIG. 4 can be used in any embodiment described in this disclosure. Other peripheral suspender arrangements could also be used and their structure may depend on the shapes of the proof masses. The peripheral suspension illustrated in FIG. 4 provides additional support to the proof masses and, if so desired, the main suspension function that will determine the resonant frequencies of the oscillation modes of the proof masses. It doesn't, however, provide any synchronization the oscillation modes and it doesn't prevent any undesired cophasal oscillation of the proof masses.

Figure 5:
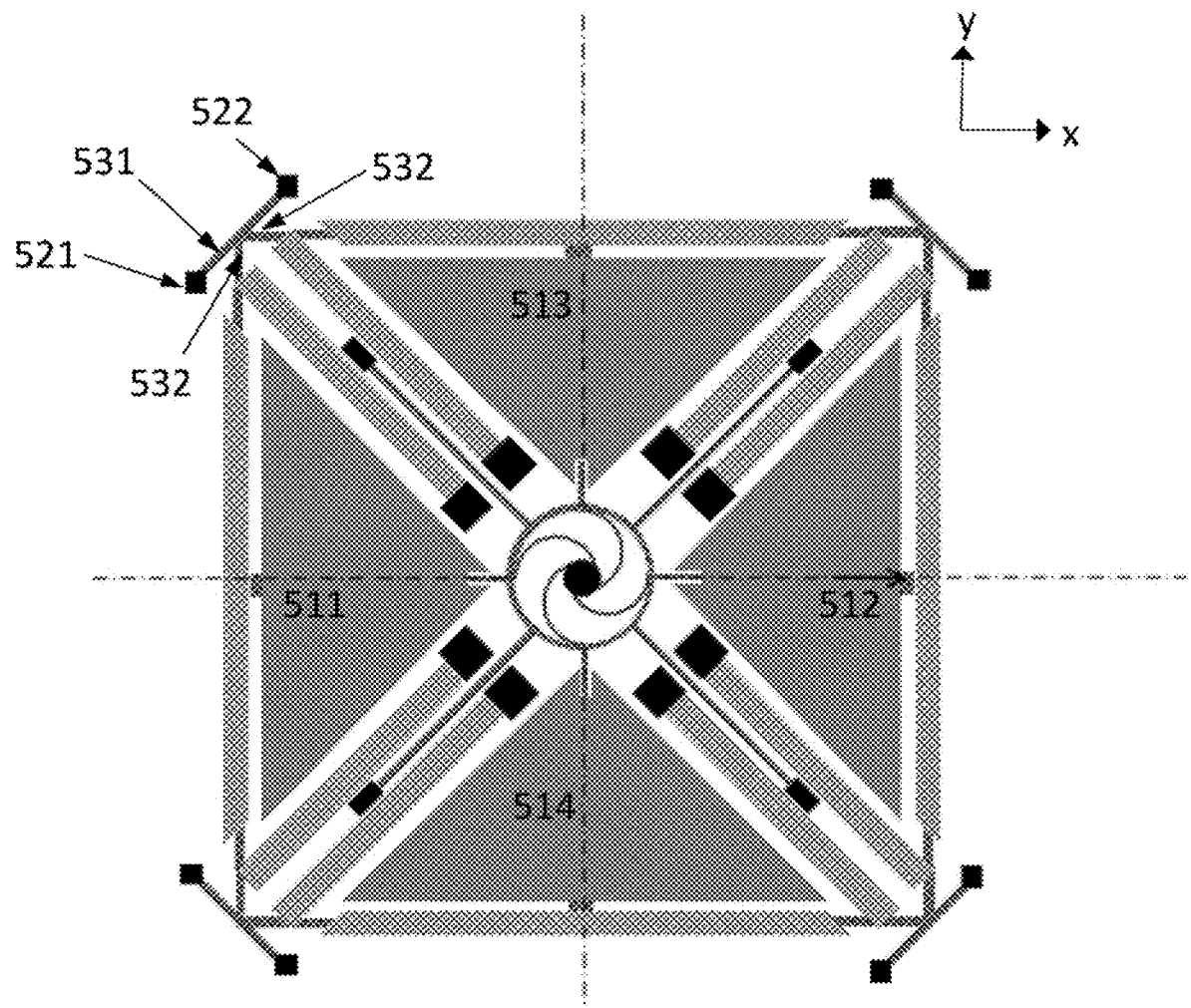

FIG. 5 illustrates an optional modification to the peripheral suspension arrangement illustrated in FIG. 4 that will provide many synchronization and prevention functions. Reference numbers 511-514 correspond to reference numbers 411-414, respectively, in FIG. 4. The illustrated suspension arrangement allows the anti-phase oscillation illustrated in FIG. 1c, where the adjacent proof masses move in opposite direction, but resists cophasal oscillation where both proof mass pairs, or any pair of adjacent proof masses, move in the same direction. In the arrangement illustrated in FIG. 5, corner bars 532 extend from each corner point on each peripheral suspender in the direction of the base of said peripheral suspender. The end of each corner bar 532 is joined to a diagonally oriented support bar 531 which extends between two anchor points 521 and 522. Alternatively, the first end of a support bar may be connected only to one anchor and the corner bars connected to the second end of the support bar. The corner bars 532 and support bars 531 are sufficiently narrow to undergo bending in the device plane.

In the anti-phase oscillation illustrated in FIG. 1c, the angle between the corner bars 532 will decrease and they will push the midpoint of support bar 531 away from the gyroscope center point when proof masses 511 and 513 rotate towards each other, and pull the midpoint of support bar 531 toward the gyroscope center point when proof masses 511 and 513 rotate away from each other. Four sets of support bars 531 and corner bars 532, each at the corner of two adjacent proof masses, will synchronize the first oscillation mode of the four proof masses. Cophasal motion of proof masses 511 and 513, which could be induced by external linear or angular vibrations, will be resisted by support bar 531 because it cannot undergo translation in the direction of either anchor point 521 or 522.

If the support bar 531 and the corner bars 532 have sufficient in-plane flexibility, the bending of the support bar in anti-phase oscillation will not hinder the desired primary oscillation. The support bar 531 and the corner bars 532 should have high out-of-plane rigidity to prevent the rotation of the proof masses 511 and 512 about x-axis and 513 and 514 about y1-axis. High out-of-plane rigidity also prevents the out-of-plane movement of the corners 472 and 473 of the suspension presented in FIG. 4. This prevents the out-of-plane bending of the legs 462 and 463 and concentrates all out-of-plane flexibility to the leg 464. This may be advantageous for designing the compliance of the suspension legs and attaching transducers to the suspension without interference from many oscillation modes.

To achieve the desired in-plane flexibility and out-of-plane rigidity the support bar 531 and corner bars 532 may have a rectangular cross section and be dimensioned so that the height-to-breadth aspect ratio of the cross section is large. Depending on the manufacturing technology it may be in the order of 10 or even larger.

Four Proof Mass Pairs

The secondary oscillation modes for x- and y-axis rotation measurement may in some situations be vulnerable to external rotational disturbances in gyroscopes with two proof mass pairs since only one pair is available for each sensing mode. This problem can be alleviated by placing two additional proof mass pairs in a similar configuration next to the original two pairs and by linking the central proof masses to each other with a spring.

Figure 6A:
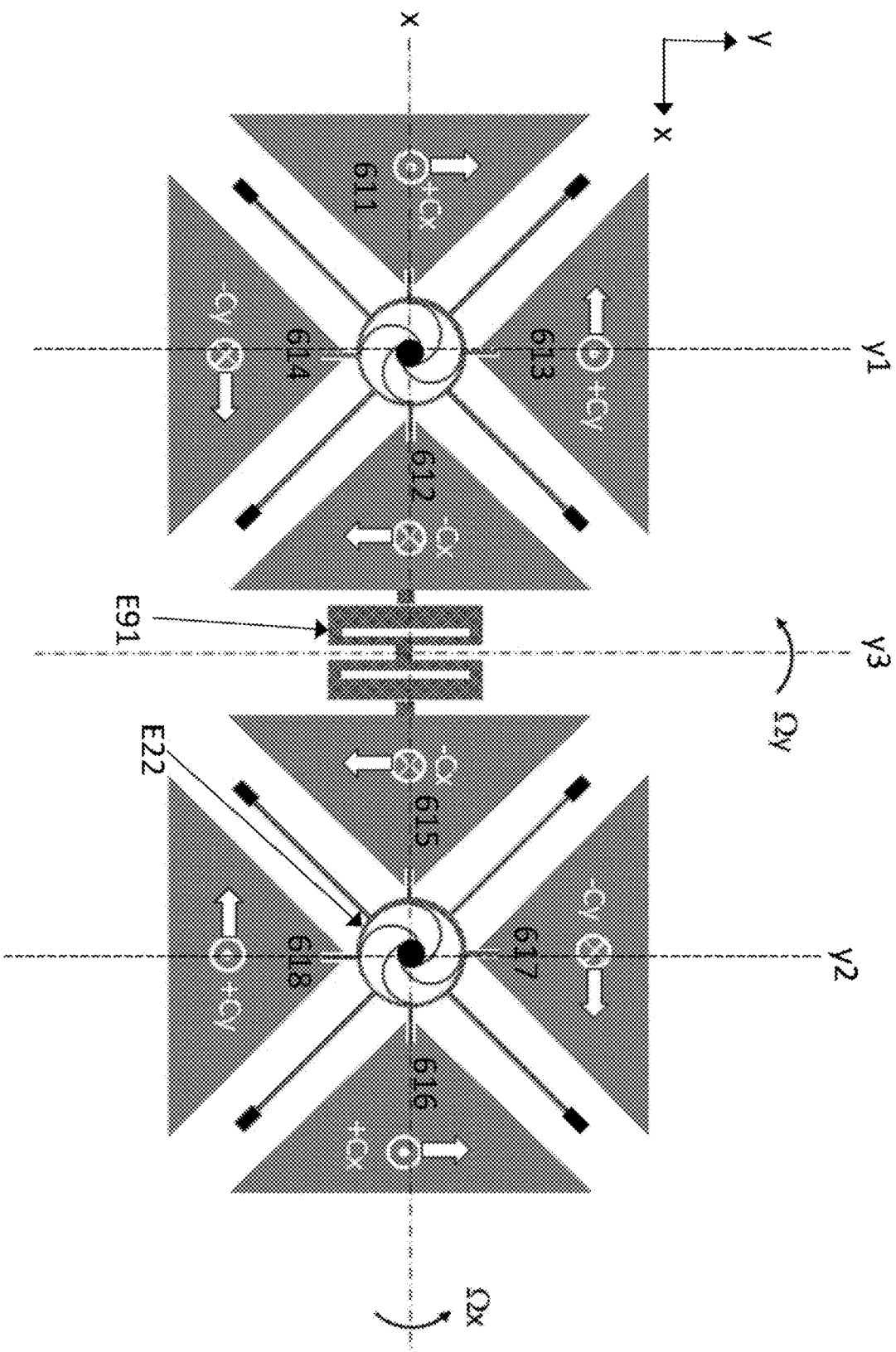
FIGS. 6a-6f illustrate gyroscopes with eight proof masses.
Figure 6B:
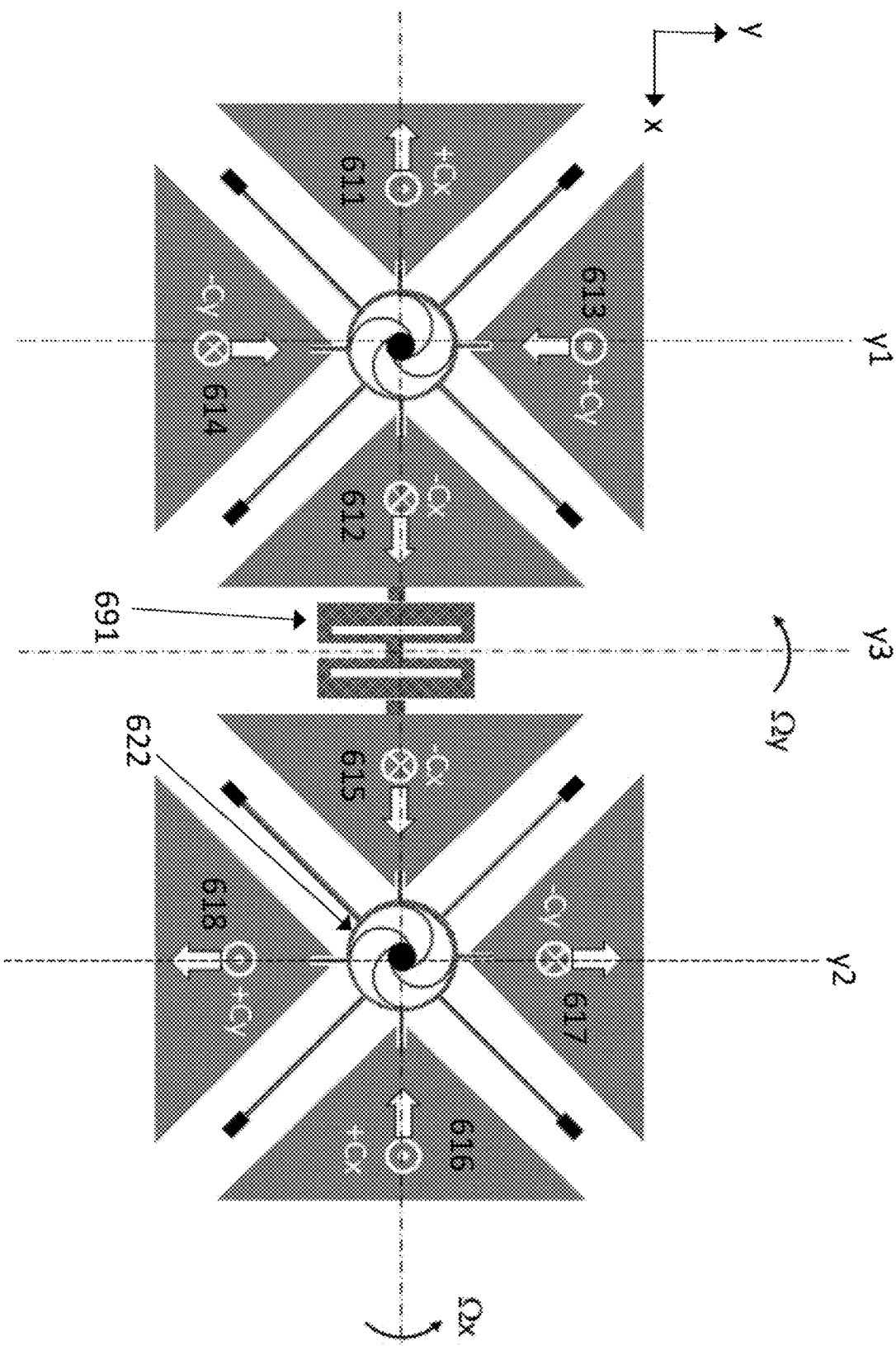

FIGS. 6a and 6b illustrate a gyroscope where reference numbers 611-614 may correspond to reference numbers 111-114, respectively, in FIGS. 1a-1f. In addition to those four proof masses, the gyroscope further comprises fifth and sixth proof masses 615 and 616 which form a third proof mass pair which in its rest position is aligned on the x-axis in the device plane. The gyroscope also comprises seventh and eighth proof masses which form a fourth proof mass pair which in its rest position is aligned on a y2-axis in the device plane. The third and fourth proof mass pairs in their rest positions form an essentially symmetrical mass distribution in relation to a second center point, where the x-axis crosses the y2-axis orthogonally, and where a vertical z2-axis crosses both the x-axis and the y2-axis orthogonally.

The gyroscope also comprises suspenders which suspend the third and fourth proof mass pairs from the one or more anchor points so that they allow the third and fourth proof mass pairs to oscillate in a primary oscillation mode initiated and sustained by the one or more drive transducers and in any of three secondary oscillation modes generated by the Coriolis effect, wherein the one or more sense transducers are configured to measure the magnitude of the three secondary oscillation modes, The primary oscillation mode of the third and fourth proof mass pairs is the same as the primary oscillation mode of the first and second proof mass pairs, The three secondary oscillation modes of the third and fourth proof mass pairs include a z-axis secondary mode, an x-axis secondary mode, and a y-axis secondary mode, which correspond to the z1-axis secondary mode, x-axis secondary mode and y-axis secondary mode, respectively, of the first and second proof mass pairs.

The oscillation of the third and fourth proof mass pairs is synchronized by a second synchronization element which comprises a second ringlike body 622 centered around the second center point in the device plane, and third and fourth x-axis torsion bars which extend along the x-axis from the second ringlike body to the fifth and sixth proof masses which form the third proof mass pair, and third and fourth y-axis torsion bars which extend along the y2-axis from the second ringlike body to the seventh and eighth proof masses which form the fourth proof mass pair.

A central synchronizing spring 691 extends along the x-axis from the second proof mass in the first proof mass pair to the third proof mass in the second proof mass pair, so that the center of the central synchronizing spring is at a third center point where a y3-axis crosses the x-axis orthogonally.

A central synchronizing spring extends along the x-axis from the second proof mass in the first proof mass pair to the fifth proof mass in the third proof mass pair, so that the center of the central synchronizing spring is at a third center point where a y3-axis crosses the x-axis orthogonally.

The central synchronizing spring synchronizes the primary oscillation mode of the first and second proof mass pairs into anti-phase oscillation in relation to the primary oscillation mode of the third and fourth proof mass pairs, so that if the primary oscillation mode of the first, second, third and fourth proof mass pairs is the first mode, the second and third proof mass pairs always rotate in opposite rotational directions around the z1-axis and z2-axis, respectively, and so that if the primary oscillation mode of the first, second, third and fourth proof mass pairs is the second mode, the second and third proof mass pairs always oscillate in the same direction along the x-axis.

In FIG. 6a, the primary oscillation of the first proof mass pair 611-612 and the second proof mass pair 613-614 is the first mode, where the proof masses undergo rotation, or a combination of rotation and linear translation, about vertical axes parallel to the z1-axis. One phase of this primary oscillation is illustrated with white arrows in FIG. 6a. In the illustrated oscillation phase, the first proof mass pair is moving clockwise and the second proof mass pair is moving counter-clockwise.

The primary oscillation of the third proof mass pair 615-616 and the fourth proof mass pair 617-618 is also the first mode. In the oscillation phase illustrated in FIG. 6a, the third proof mass pair is moving counter-clockwise, while the fourth proof mass pair is moving clockwise. The central synchronizing spring 691 ensures that centrally located proof masses 612 and 615 move in the same direction. The first and second synchronization elements, located at the first center point (where the x-axis crosses the y1-axis) and the second center point (where the x-axis crosses the y2-axis), respectively, synchronize the other masses on each side of the gyroscope into the illustrated oscillation phases.

In FIG. 6b, the primary oscillation of the first proof mass pair 611-612 and the second proof mass pair 613-614 is the second mode, where the proof masses undergo towards and away from the first center point. One phase of this primary oscillation is illustrated with white arrows in FIG. 6b. In the illustrated oscillation phase, the first proof mass pair is moving away from the first center point, and the second proof mass pair is moving towards the first center point.

The primary oscillation of the third proof mass pair 615-616 and the fourth proof mass pair 617-618 is also the second mode. In the oscillation phase illustrated in FIG. 6b, the third proof mass pair is moving towards the second center point, while the fourth proof mass pair is moving away from the second center point. Again, the central synchronizing spring makes centrally located proof masses 612 and 615 move consistently in the same direction along the x-axis, and the first and second synchronizing element synchronize the other masses into the illustrated oscillation phases.

In order to carry out the synchronization tasks illustrated in both FIG. 6a and FIG. 6b, the central synchronizing spring 691 should preferably transfer motion in x-axis, y3-axis and z3-axis directions from proof mass 612 to proof mass 615 and vice versa so that the first oscillation mode, the second oscillation mode and one the out-of-plane secondary oscillation mode are effectively synchronized. The spring 691 may be relatively rigid for linear movement in y3-axis direction, so that the transversal anti-phase movement between 612 and 615 is prevented. The spring 691 may be flexible for rotation about the z3-axis allowing an in-plane tilt angle between the proof masses 612 and 615 and thus the desired anti-phase rotation about each proof masse rotation center. The spring may be also flexible for rotation about the y3-axis so that it allows the out-of-plane rotational movement of the proof masses 612 and 615 by allowing a tilt angle between them but doesn't allow anti-phase out-of-plane movement between 612 and 615. Also the synchronizing spring 691 may increase to some degree the spring constant for the mode where proof masses 612 and 615 move to opposite directions compared to the mode where they move to the same direction thus creating a separation of the anti-phase and cophasal resonant frequencies of the second mode.

Figure 6C:
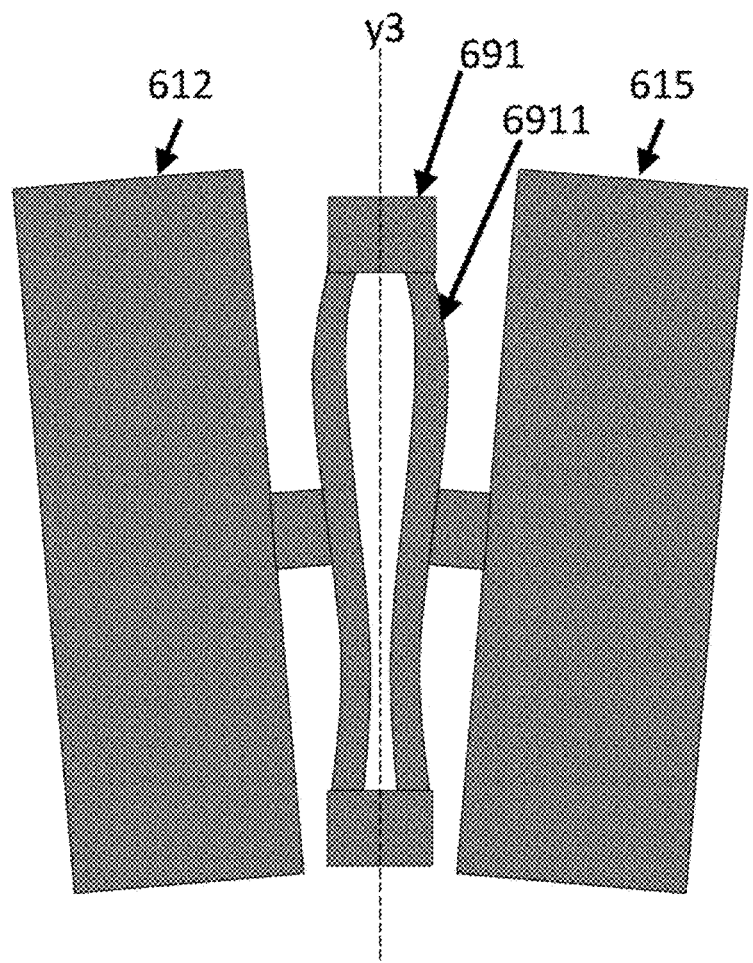
Figure 6D:
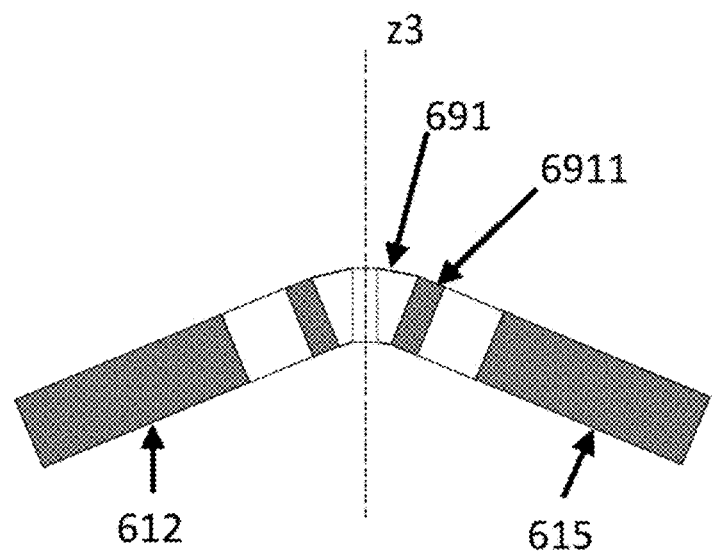

FIGS. 6c and 6d illustrate a possible structure for the spring 691 as an in-plane view and as a cross section, correspondingly. Spring 691 may contain at least one bar 6911 in direction of the y3-axis, which bar has in-plane flexibility and torsional flexibility, but which is rigid for out-of-plane bending. One of the proof masses 612 or 615 is attached to the mid-point of the bar 6911 and the other proof mass to the ends of the bar. Preferably the spring 691 is symmetrical containing two bars 6911 attached to each other at the ends and to the proof masses at the mid-points. To achieve the desired in-plane flexibility and out-of-plane rigidity the bar 6911 may have a rectangular cross section and be dimensioned so that the height-to-breadth aspect ratio of the cross section is large. Depending on the manufacturing technology it may be in the order of 10 or even larger.

As illustrated in FIGS. 6a and 6b, due to the anti-phase organization of primary oscillation in the proof mass pairs, the secondary oscillation modes induced by the Coriolis force in response angular rotation about the x-axis or an axis parallel to the y1- and y2-axes will also occur in anti-phase. The first and third proof mass pairs always oscillate in opposite directions about the y1- and y2-axes, respectively, and the second and fourth proof mass pairs always oscillate in opposite directions about the x-axis. Any disturbing external vibrations which, for example, set the second and fourth proof mass pairs in cophasal rotation about the x-axis, where they both rotate in the same direction, can be automatically cancelled by reading a differential signal from the sense transducers which measure the secondary oscillation of each proof mass pair. The same applies also to the secondary modes which occur when the gyroscope rotates about an axis parallel to the z-axis. They are robust to all external vibrations already in the four-mass configurations of FIGS. 1b and 1c, but the increased number of proof masses helps to eliminate the remaining errors due to inaccuracy in manufacturing. These secondary modes have not been illustrated in FIGS. 6a and 6b.

Figure 6E:
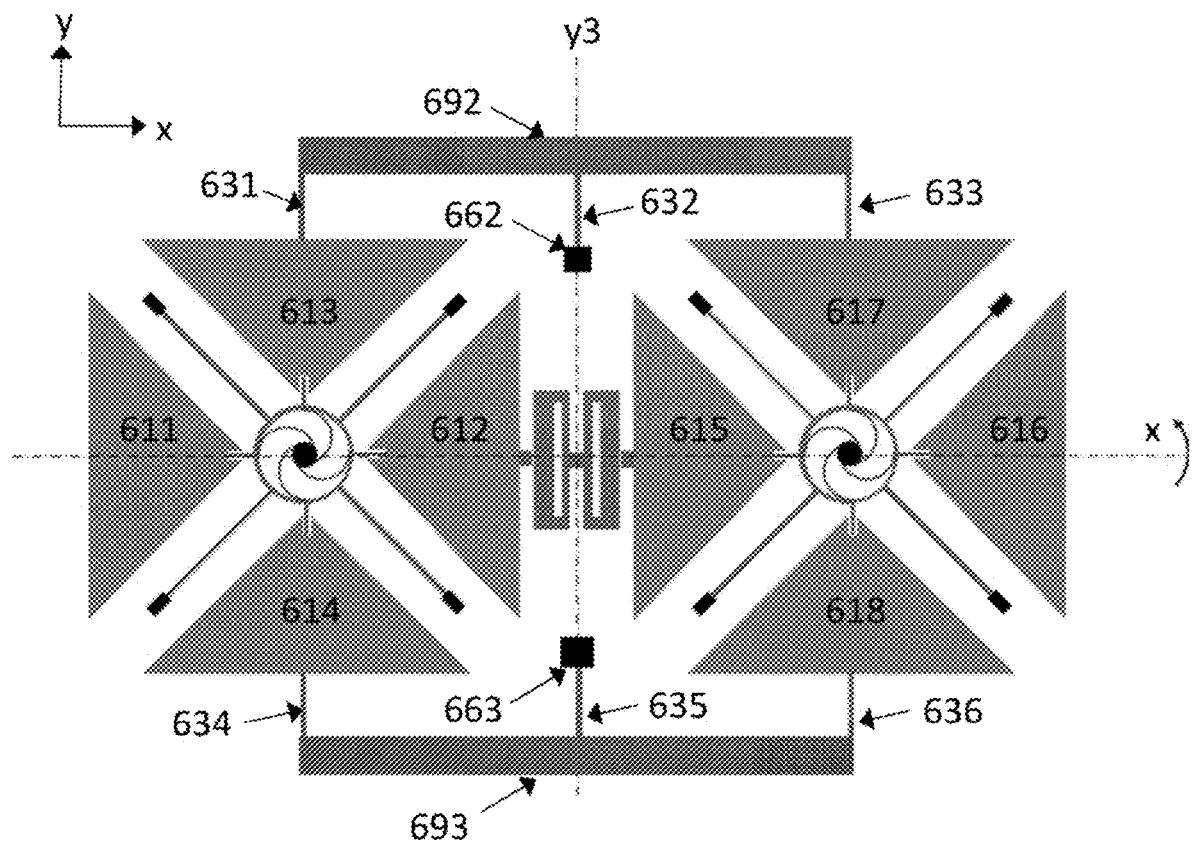

Additional peripheral synchronization springs may be added according to need. They may, for example, be configured to counteract cophasal oscillation in the second and fourth proof mass pairs. FIG. 6e illustrates a gyroscope where peripheral synchronization springs also synchronize the oscillation of the second proof mass pair 613-614 and the fourth proof mass pair 617-618. In this gyroscope, the one or more anchor points comprise an upper anchor point 662 aligned on the y3-axis, and a lower anchor point 663 aligned on the y3-axis. The upper and lower anchor points 662 and 663 lie on opposite sides of the third center point. The gyroscope further comprises an upper synchronization element 691 which is connected to the upper anchor point 662, the third proof mass 613 and the seventh proof mass 617 with torsion/flexure bars 631-633, and the gyroscope further comprises a lower synchronization element 693 which is connected to the lower anchor point 663, the fourth proof mass 614 and the eighth proof mass 618 with torsion/flexure bars 634-636.

The upper and lower synchronization elements 692 and 693 may rotate about the y3-axis when the second and fourth proof mass pairs oscillate in their secondary mode about the x-axis. These synchronization elements resist cophasal secondary oscillation, where the second and fourth proof mass pairs would oscillate in the same direction about the x-axis. In this mode the torsion/flexure bars 631 . . . 636 will exhibit torsional deformation The upper and lower synchronization elements 692 and 693 may also rotate about an axis parallel to the z3-axis when the second and fourth proof mass pairs oscillate along y1- and y2-axes as illustrated in FIG. 6b. These synchronization elements resist cophasal oscillation of the second and fourth proof mass pairs along the y1- and y2-axes. In this mode the torsion/flexure bars 631 . . . 636 will exhibit flexural deformation. When the oscillation mode is the first mode, the torsion/flexure bars 631, 633, 634 and 636, which are connected to proof masses 613, 617, 614 and 618, respectively, may bend leftward and rightward in FIG. 6e to accommodate the movement illustrated in FIG. 6a. The torsion/flexure bars 632 and 635, connected to the anchor points 662 and 663 will not flex since the synchronization elements 692 and 693 will remain immobile. It must be noted that the synchronization elements 692 and 693 will not synchronize nor prevent any unwanted oscillations in the first mode.

The bars 631 . . . 636 must have flexibility for in-plane bending and torsional flexibility but they must remain rigid for out-of-plane bending. To achieve this requirement the bars may have a rectangular cross section and be dimensioned so that the height-to-breadth aspect ratio of the cross section is large. Depending on the manufacturing technology it may be in the order of 10 or even larger. Also the length to height ratio may be larger than 1.

The synchronization element embodiments presented above in FIGS. 2a-2b and 3a-3d for a gyroscope with two mass pairs can be applied directly also to the gyroscopes with four mass pairs illustrated in FIGS. 6a-6f.

In other words, the one or more anchor points may comprise central anchor points located at the first and second center points. Each synchronization element may comprise four or more curved suspenders in the device plane, which extend from the corresponding central anchor point to the corresponding ringlike body.

Each synchronization element may comprise a gimbal structure inside the corresponding ringlike body in the device plane. The gimbal structures may correspond to the ones that were described above and illustrated in FIGS. 3a-3d.

Figure 6F:
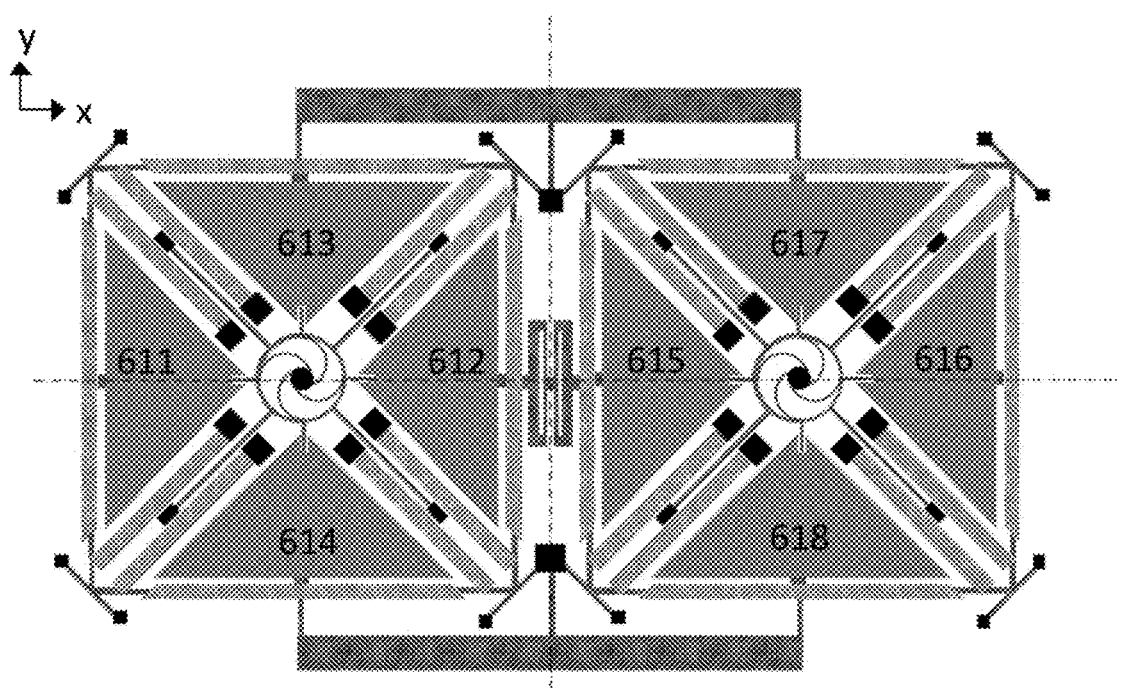

The peripheral suspension arrangement illustrated in FIG. 4 may be utilized on both sides of the gyroscope illustrated in FIGS. 6a-6e, as illustrated in FIG. 6f. The central synchronizing spring 691 may in this case extend from the base of the iscosceles triangle surrounding proof mass 612 to the base of the isosceles triangle surrounding proof mass 615. Other peripheral suspension arrangements may also be used. The peripheral suspension arrangement should allow the motion indicated for proof masses 612 and 615 in FIGS. 6a and 6b and allow their synchronization via the spring 691. Upper and lower synchronization elements may similarly extend from one peripheral suspension arrangement to another.

Furthermore, the peripheral anchoring and support arrangement illustrated in FIG. 5 can also be utilized on both sides of the gyroscope illustrated in FIGS. 6a-6e, as illustrated in FIG. 6f.

As illustrated in FIGS. 2b and 6a-6b, each of the first and second synchronization elements may be suspended from four diagonal anchor points, wherein each of the diagonal anchor points is located between proof masses from different proof mass pairs, so that there is one diagonal anchor point between all adjacent proof masses, and each synchronization element comprises four diagonal suspenders in the device plane. Each diagonal suspender extends from a diagonal anchor point to the corresponding ringlike body, and each diagonal suspender is oriented at an angle of 45° in relation to both the x-axis and the y-axis.

Any embodiment presented in this disclosure can be implemented also in the gyroscopes with four mass pairs illustrated in FIGS. 6a-6f.

Capacitive Actuation and Sensing

The one or more drive transducers and the one or more sense transducers may be capacitive force transducers. In the following presentation, both of these options will be illustrated in combination with the exemplary peripheral suspension arrangement illustrated in FIG. 4. Actuation and sensing may have to be organized in a different manner in gyroscopes where a different peripheral suspension arrangement is used.

Figure 7A:
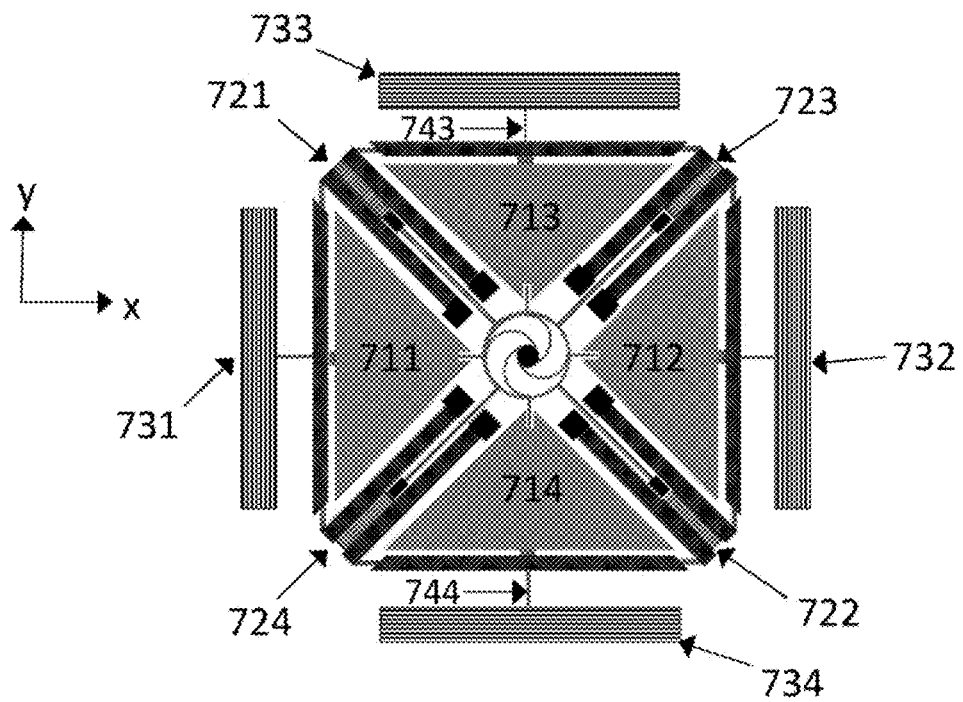
FIGS. 7a-7f illustrate capacitive primary and secondary force transducers.

FIG. 7a illustrates a gyroscope where reference numbers 711-714 may correspond to reference numbers 111-114, 611-614 or 615-618 in FIGS. 1a-1e and 6a-6f, respectively. To generate primary oscillation in the first mode, or to measure secondary oscillation in the first mode, the gyroscope comprises capacitive transducers 721-724 placed between the adjacent legs of adjacent peripheral suspenders. These transducers are discussed in more detail with reference to FIG. 7e below.

To generate primary oscillation in the second mode, or to measure secondary oscillation in the second mode, the gyroscope comprises capacitive transducers 731-734. These transducers may comprise parallel-plate capacitors, where the gap between stator electrodes on a fixed plate and rotor electrodes on a moving plate changes due to the movement of the proof mass along the x- or y-axis. Alternatively, the transducers may comprise lengthwise moving comb capacitors where the overlap between fixed and moving combs changes due to the movement of the proof mass along the x- or y-axis. The plate-type transducer is better suited to detection of a small motion whereas the lengthwise moving comb type transducer is better suited for generating motion or detecting a large amplitude motion. The moving plates or the lengthwise moving comb of the transducer may be connected to the base of the corresponding peripheral suspender by a connection bar, such as the connection bar 743 which connects the transducer 733 to the peripheral suspender surrounding proof mass 713. If the first mode and the second mode are to be obtained simultaneously (one as the primary mode and the other as a secondary mode), the connections bars should be sufficiently narrow and flexible to allow facilitate oscillation in the first mode, while nevertheless being sufficiently rigid to transmit oscillation in the second mode to/from the corresponding proof mass. The transducers 731-734 are discussed in more detail below, with reference to FIG. 7f.

If the illustrated two pairs of proof masses would be coupled to an additional pair of proof masses, as in FIGS. 6a-6f, then the transducer 732 on the right side of proof mass 712 would instead be placed on the right side of the sixth proof mass, such as 616 in FIGS. 6a-6f.

Figure 7B:
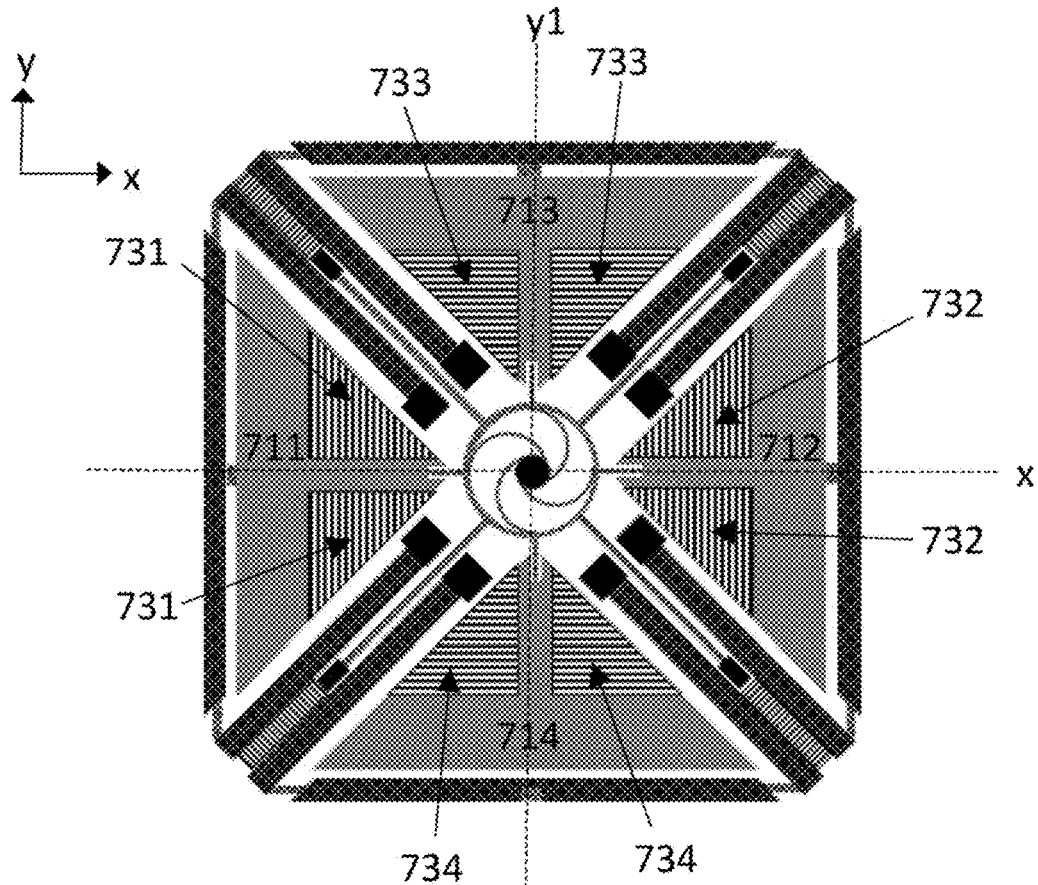

FIG. 7b illustrates an alternative arrangement for generating primary oscillation in the second mode or measuring secondary oscillation in the second mode. In this case, capacitive transducers comprising stator electrodes on fixed plates and rotor electrodes moving plates are arranged inside the peripheral suspenders. The surface area of proof masses 711-714 must in this case be reduced to accommodate the capacitive electrode plates.

Figure 7C:
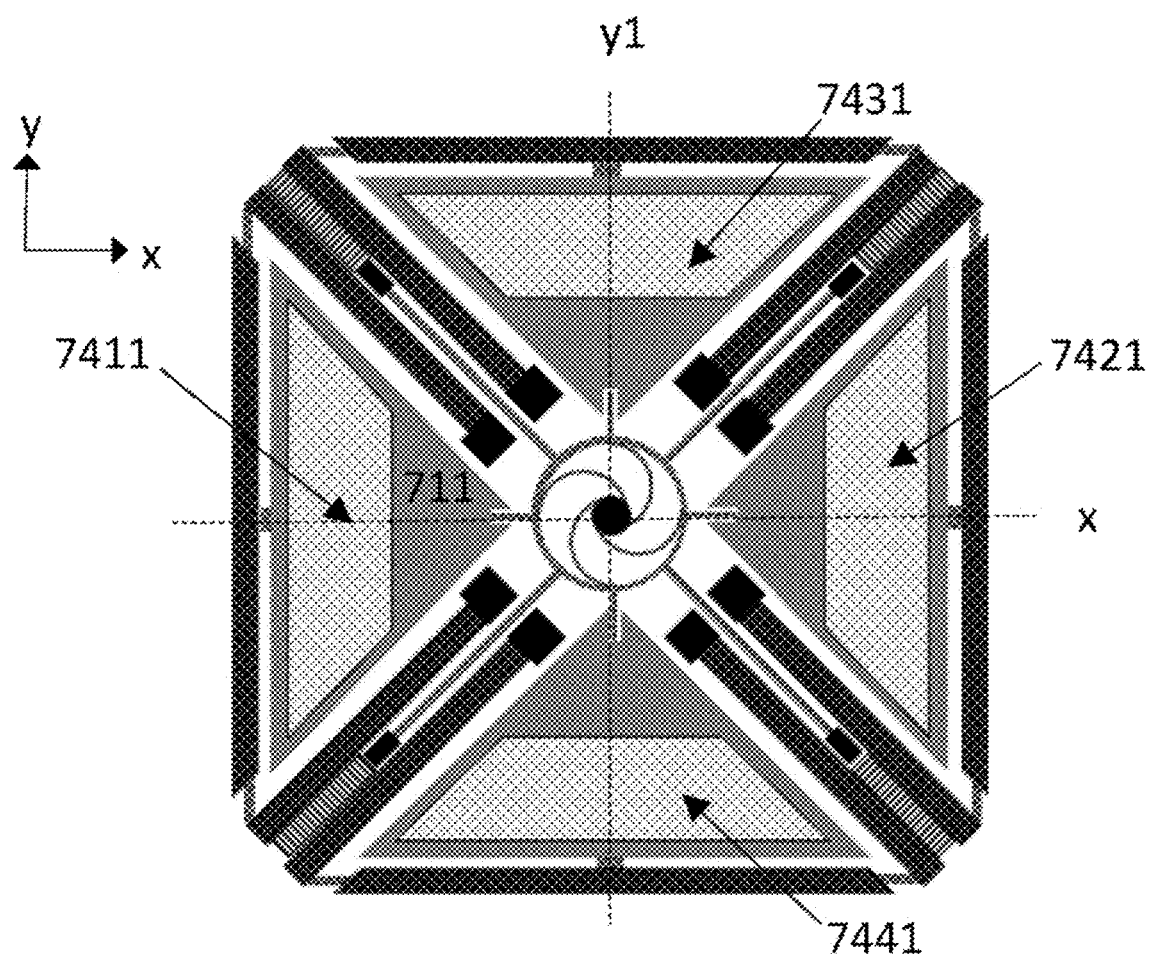
Figure 7D:
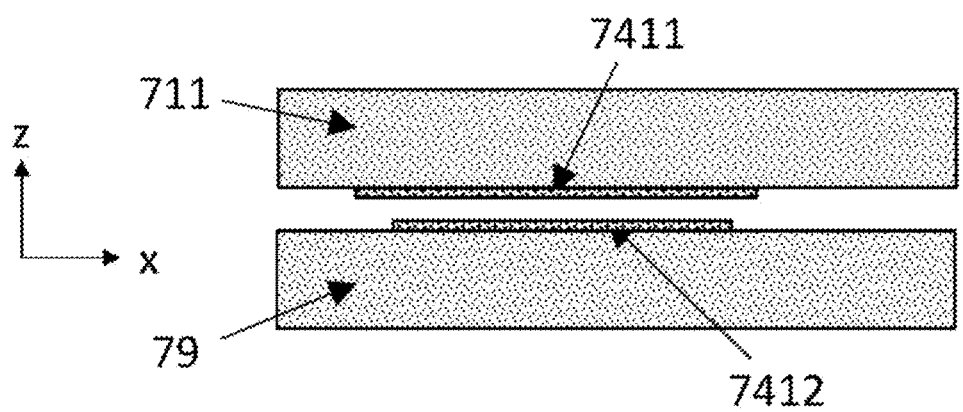

FIG. 7c illustrates an arrangement for measuring secondary oscillation in the x-axis secondary mode or y-axis secondary mode, where one or both proof mass pairs oscillate out of the device plane. Each proof mass comprises at least one rotor electrode 741-744 which forms a capacitive transducer together with a stator electrode located above or below the proof mass. FIG. 7d illustrates the same arrangement from a vertical perspective. The proof mass 711 is surrounded by a cavity where it can oscillate in the out-of-plane direction. The cavity is delimited by a support wafer or cap wafer 79. The rotor electrode 7411 is placed on the proof mass and the stator electrode 412 on the support wafer or cap wafer 79. If the proof mass is made of silicon, it may be sufficiently conductive to be utilized as a rotor electrode even without any electrode coating. It is advantageous to dimension the rotor and stator electrodes so that one is larger than the other without any crossing or coincidence of the boundaries of the electrodes at any point. This way the capacitance remains insensitive to any in-plane motion of the proof masses and detects only the out-of-plane motion.

Figure 7E:
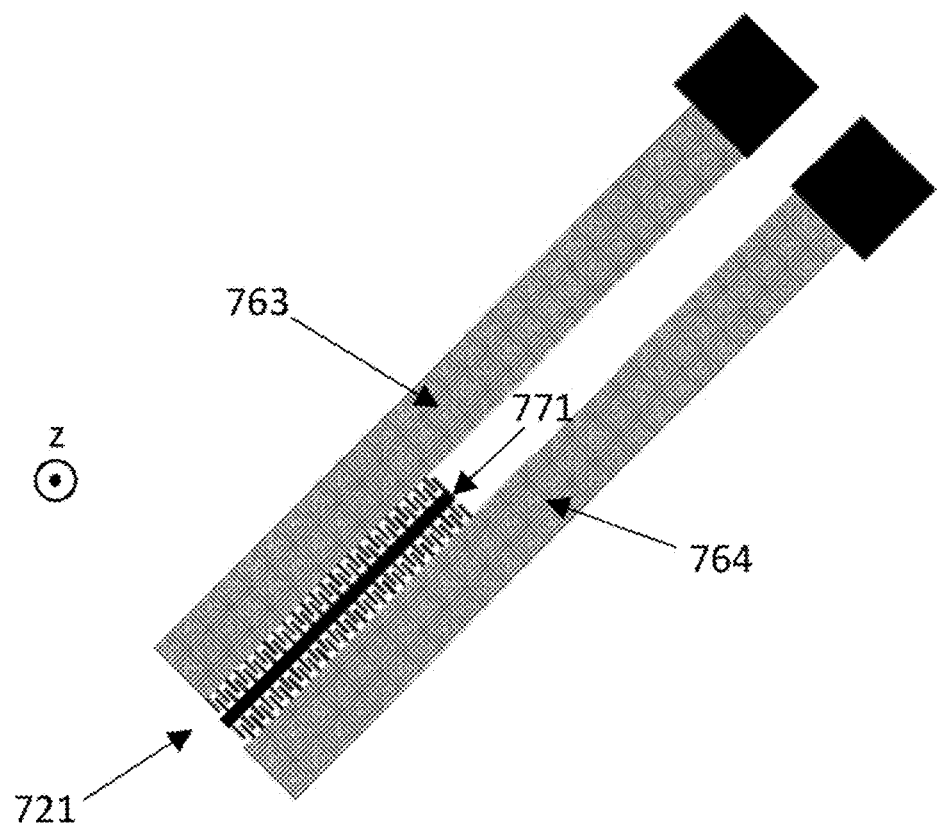
Figure 7F:
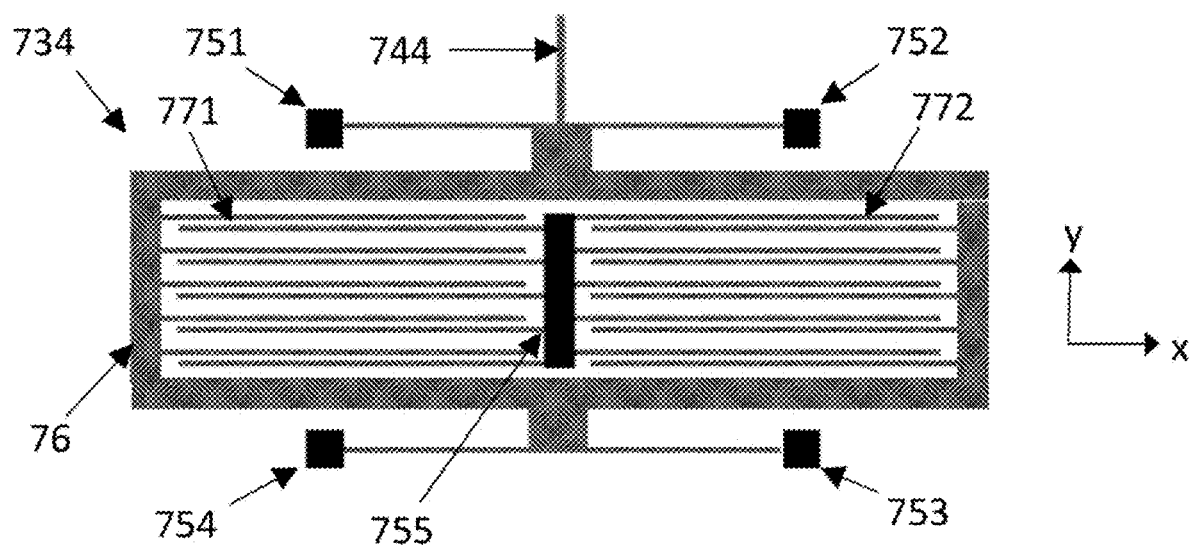

FIG. 7e illustrates in more detail the transducers 721-724 which can generate primary oscillation in the first mode and/or detect the oscillation amplitude in the first mode. The transducers comprise stator electrodes on an anchored stator beam 771 which is parallel to the second leg 763 of one peripheral suspender and the first leg 764 of an adjacent peripheral transducer. Rotor electrodes parallel to the stator electrodes are formed in the second leg 763 and the first leg 764. When suitable voltages are applied to the rotor and stator electrodes, the legs 763 and 764 bend in the xy-plane either away or towards the stator beam 771. Correspondingly, when the overlap between the rotor and stator electrodes changes the capacitance will change and at a constant charge an AC voltage is generated across the transducer or at a constant voltage an AC current will flow through the transducer Finally, FIG. 7f illustrates an exemplary structure for the parallel plate type transducers 731-734 in FIG. 7b. The transducer comprises a rotor frame 76 suspended from anchor points 751-754, and an fixed stator bar 755 within the rotor frame 76. Rotor electrodes 771 and stator electrodes 772 together form a capacitive transducer which is connected to the adjacent proof mass with connection bar 744.

Piezoelectric Actuation and Sensing

The one or more drive transducers and the one or more sense transducers may be piezoelectric force transducers. These transducers may be deposited onto the peripheral suspenders. The suspenders may in this case be silicon beams with a sufficiently large width/length and height/length aspect ratios to be bent by the piezoelectric force produced by the transducer, and/or by the secondary oscillation mode of the proof mass.

Figure 8:
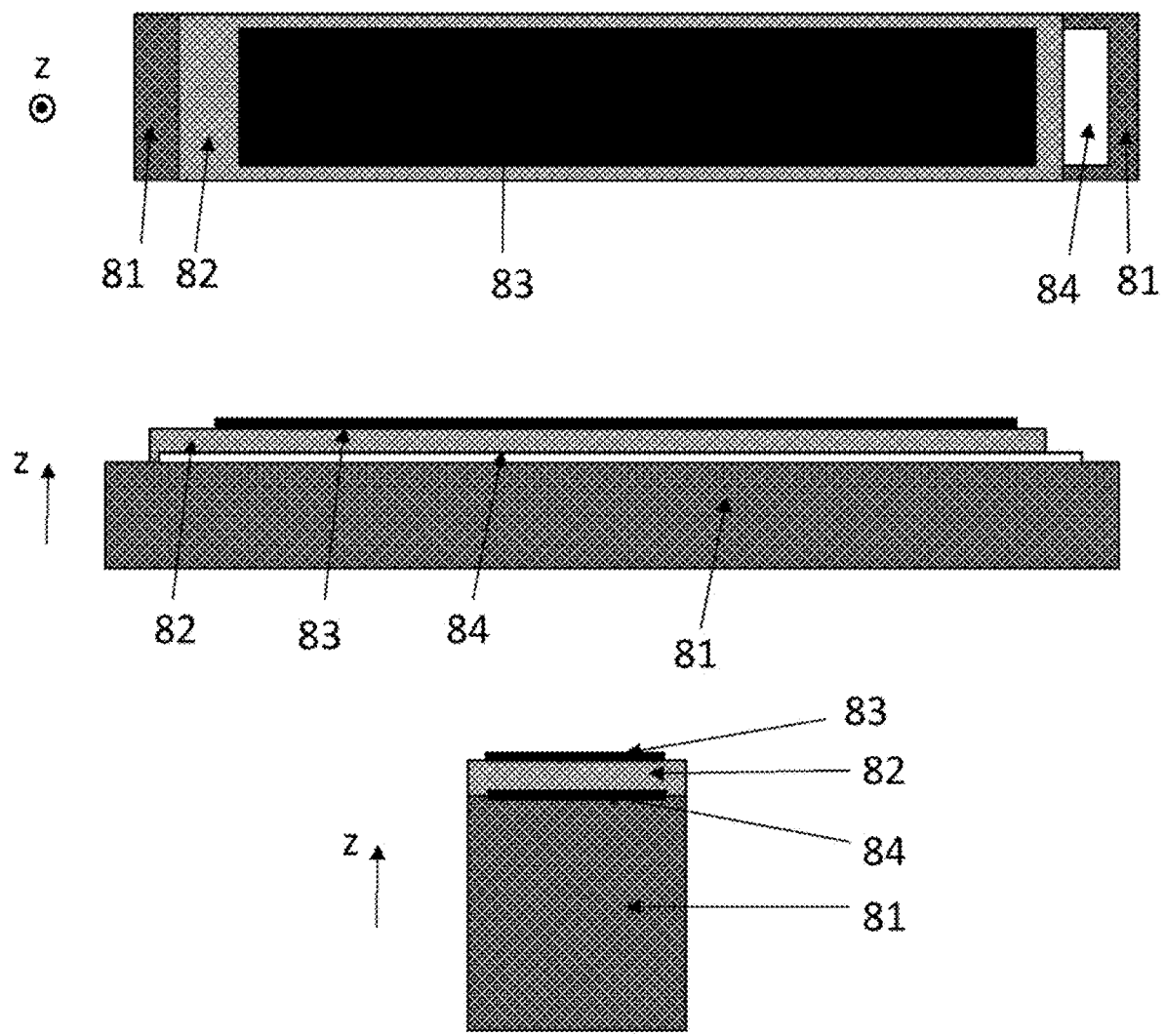
FIGS. 8-9 illustrate piezoelectric in-plane and out-of-plane force transducers.

FIG. 8 illustrates three cross-sections of a bending piezoelectric transducer configured for out-of-plane-bending. The transducer includes a layer of piezoelectric material and two electrode layers deposited on a silicon suspender 81. The transducer has an oblong shape in the x-y-plane. The transducer includes a bottom electrode layer 84, a layer of piezoelectric material 82 and a top electrode layer 83. The layers 84, 82 and 83 together form a piezoelectric transducer. The suspender 81 bends out of the xy-plane when a drive voltage is applied to the electrodes. Conversely, a sense voltage signal can be read from electrode layers 83 and 84 if the suspender 81 is bent out of the xy-plane by an external force.

Figure 9:
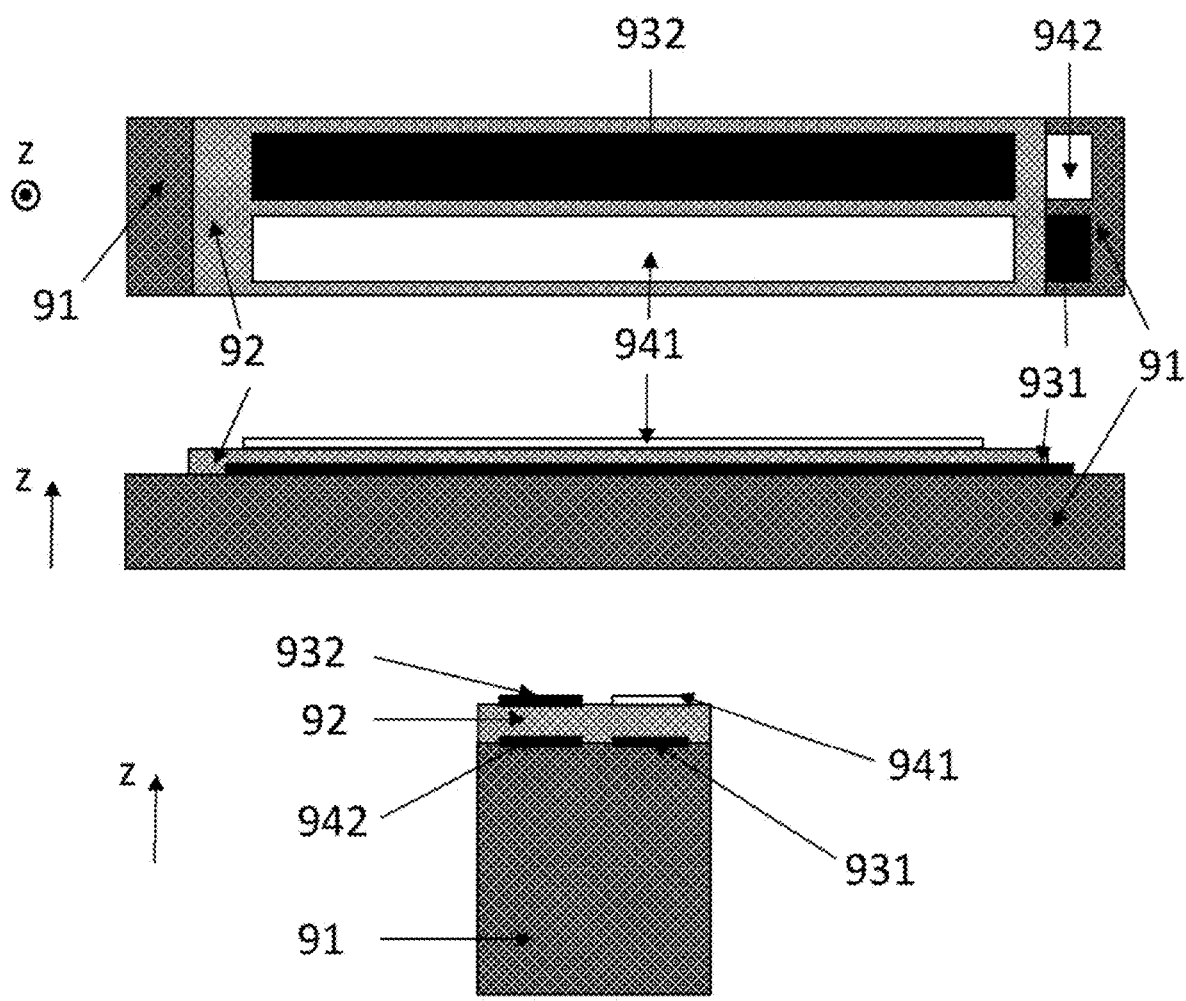

FIG. 9 illustrates three cross-sections of a bending piezoelectric transducer configured for in-plane-bending. A pair of first electrode layers 941 and 942 are placed on a suspender 91, one on the upper side of a layer of piezoelectric material 92 and one on the lower side (up and down refers in this case to the direction of the z-axis). These electrodes are paired with second electrode layers 931 and 932, respectively, as illustrated in the figure. Layers 941, 92 and 931 together form a first piezoelectric transducer, and layers 942, 92 and 932 together form a second piezoelectric transducer.

If drive voltages with opposite polarity are applied to these two transducers, the two transducers produce opposite strains in the xy-plane, which can bend the suspender 91 in the device plane. If the transducers are used as sense transducers, in-plane bending will generate a voltage differential between the two transducers, which can be read as a sense signal.

The drawing conventions of FIGS. 8 and 9 will be employed throughout this disclosure to illustrate piezoelectric transducers for in-plane and out-of-plane bending. In other words, two parallel rectangles of opposite colour will be used to indicate a piezoelectric transducer configured to measure or actuate in-plane bending. For simplicity, these two parallel rectangles will primarily be referred to in the singular, as a single in-plane transducer, even though the structure is actually a construction which comprises two transducers. Similarly, the drive and sense signals pertaining to one transducer will be referred to in the singular, as a single drive/sense signal, even though they actually comprise two voltages.

Black and white colours indicate transducer polarity. The polarity of a transducer with a white rectangle on the right-hand side is opposite to the polarity of a transducer (seen in the same figure) with a black rectangle on the on the right-hand side. A single, larger rectangle will be used to indicate a piezoelectric transducer configured to measure or actuate out-of-plane bending. Out-of-plane transducers in black colour will bend in the opposite direction as out-of-plane transducers in white colour if they are actuated with voltages of the same polarity.

The piezoelectric layers 82 and 92, which may be an aluminium nitride (AlN) layer, are typically not thicker than a few micrometers. The thickness of the suspenders 81 and 91 may, for example, be between 4-100 µm, preferably between 10-50 µm.

When piezoelectric transducers described in this disclosure are used in the sense mode, the largest output voltage between the electrodes of the transducer may be achieved when the transducer capacitance equals the sum of the capacitance of the external connections and the input capacitance of the amplifier. The capacitance of the transducer is determined by its area and by the thickness of the piezoelectric layer.

Figure 10A:
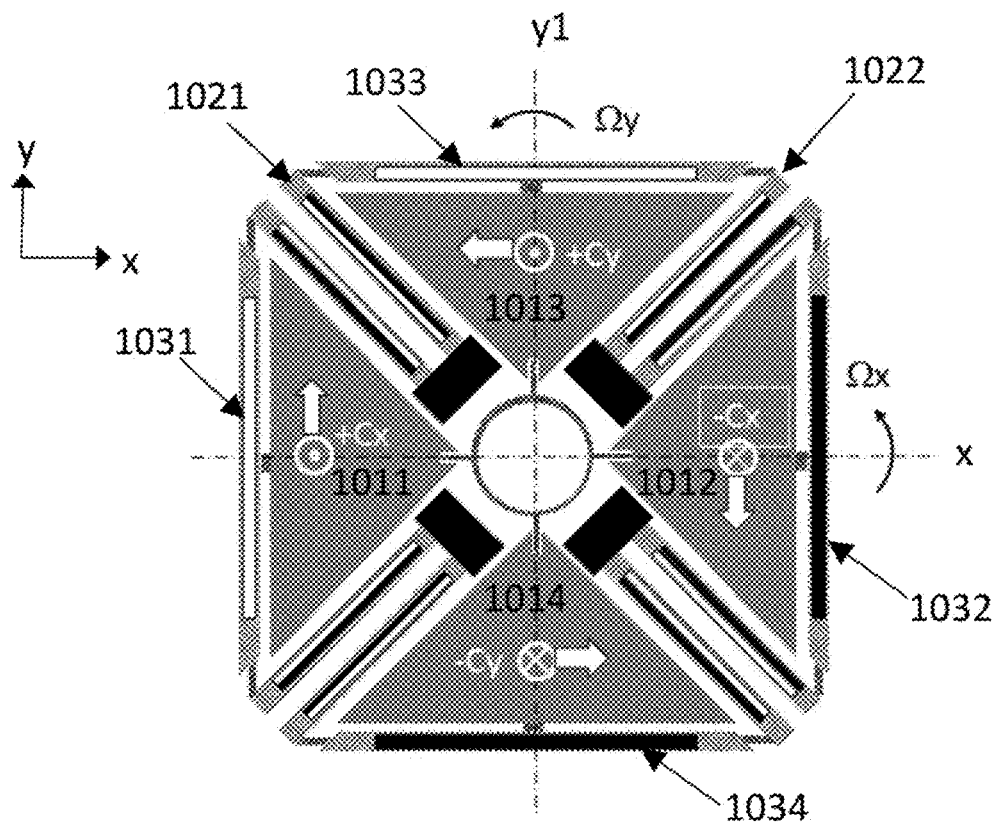
FIGS. 10a-10d illustrate piezoelectric primary and secondary force transducers.

FIG. 10a illustrates a two-axis gyroscope where reference numbers 1011-1014 may correspond to reference numbers

111-114, 611-614 or 615-618 in FIGS. 1*a*-1*e* and 6*a*-6*f*, respectively. To generate primary oscillation in the first mode, the gyroscope may comprise piezoelectric in-plane transducers such as 1021 and 1022 on each leg of a peripheral suspender which partly surrounds one of the proof masses. A drive voltage applied to the in-plane transducer will bend the leg in one direction and thereby move or rotate the proof mass in that direction.

One in-plane transducer on one leg of a peripheral suspender may be sufficient for generating or measuring the desired oscillation in one proof mass, but two transducers on the two legs of the suspender will be preferable in most cases. To measure secondary oscillation in the x-axis secondary mode or the y-axis secondary mode, the gyroscope may comprise piezoelectric out-of-plane transducers 1031-1034 on the base of each peripheral suspender which partly surrounds one of the proof masses.

As illustrated in FIG. 10*a*, the legs of one peripheral suspender may comprise in-plane transducers of the same polarity, and the adjacent legs of two peripheral suspenders that surround separate proof masses may comprise in-plane transducers of opposite polarity. When the same drive voltage signal is applied all in-plane transducers, this arrangement will generate the primary oscillation illustrated with white arrows in FIG. 10*a*, where the first proof mass pair 1011-1012 and the second proof mass pair 1013-1014 oscillate about the z1-axis in anti-phase, always in opposite rotational directions.

As illustrated in FIG. 10*a*, the bases of two peripheral suspenders that surround the two masses which form a proof mass pair may comprise out-of-plane transducers of opposite polarity. In the x-axis secondary mode, for example, the out-of-plane transducer 1031 will bend at the middle toward the positive z-direction when the out-of-plane transducer 1032 bends at the middle toward the negative z-direction, and vice versa. The sense signal for rotation around the x-axis can thereby be read directly as the combined signal from these two transducers. The same considerations apply to out-of-plane transducers 1033 and 1034 and y1-axis rotation.

Figure 10B:
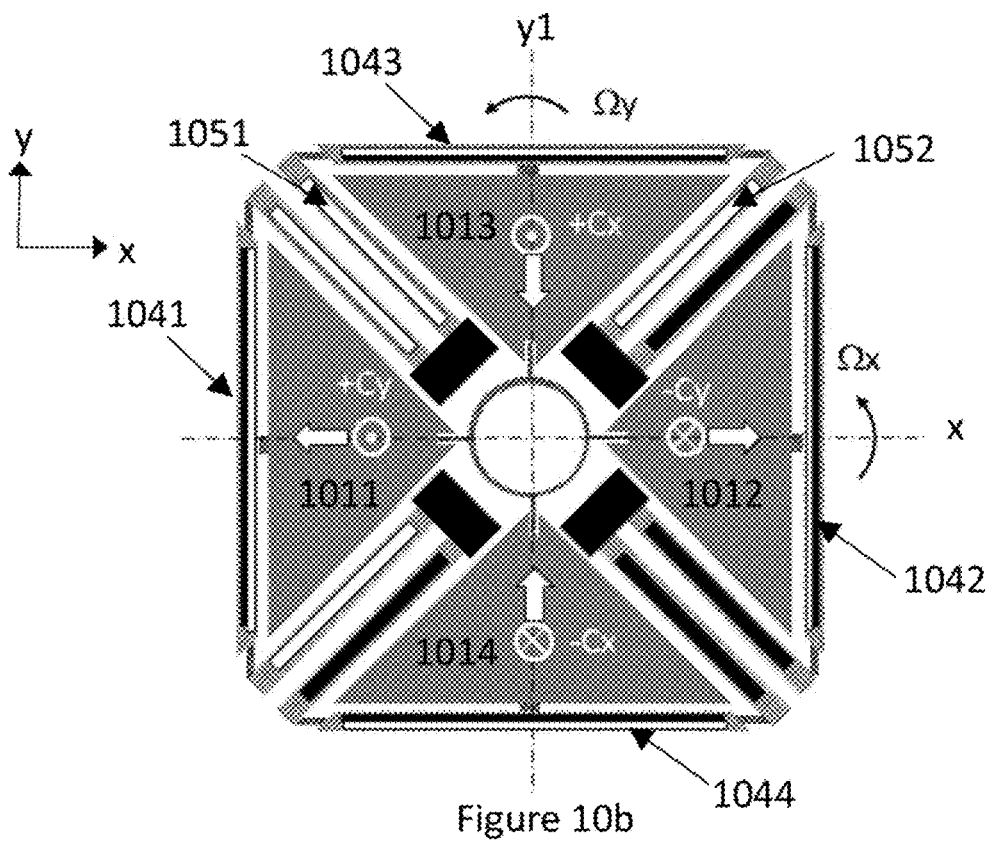

FIG. 10*b* illustrates a two-axis gyroscope where reference numbers 1011-1014 may correspond to reference numbers 111-114, 611-614 or 615-618 in FIGS. 1*a*-1*e* and 6*a*-6*f*, respectively. To generate primary oscillation in the second mode, the gyroscope may comprise piezoelectric in-plane transducers 1041-1044 on the base of each peripheral suspender which partly surrounds one of the proof masses. Again, in one proof mass pair, the bases of the peripheral suspenders may comprise in-plane transducers of opposite polarity, as indicated in FIG. 10*b*. When the same drive voltage signal is applied to these transducers, the in-plane transducers on opposite sides of the gyroscope will bend at the middle in opposite in-plane directions, so that the proof masses in each proof mass pair will oscillate towards or away from the center point in anti-phase, always in the opposite direction.

To measure secondary oscillation in the x-axis secondary mode or the y-axis secondary mode, the gyroscope may comprise out-of-plane transducers such as 1051 and 1052 on each leg of a peripheral suspender which partly surrounds one of the proof masses. When a proof mass moves out of the device plane, the legs of the peripheral suspender must bend in the same out-of-plane direction. As illustrated in FIG. 10*b*, the two peripheral suspenders of one proof mass pair may comprise out-of-plane transducers of opposite polarity, so that the rotation of the proof mass pair can be read as the combined signal from all out-of-plane transducers in the proof mass pair.

In FIGS. 10*a*-10*d*, adjacent peripheral suspenders share a common anchor point where one leg of each peripheral suspender is anchored. These legs may alternative be anchored separately, in the manner illustrated for example in FIG. 4 and FIGS. 7*a*-7*c*.

Figure 10C:
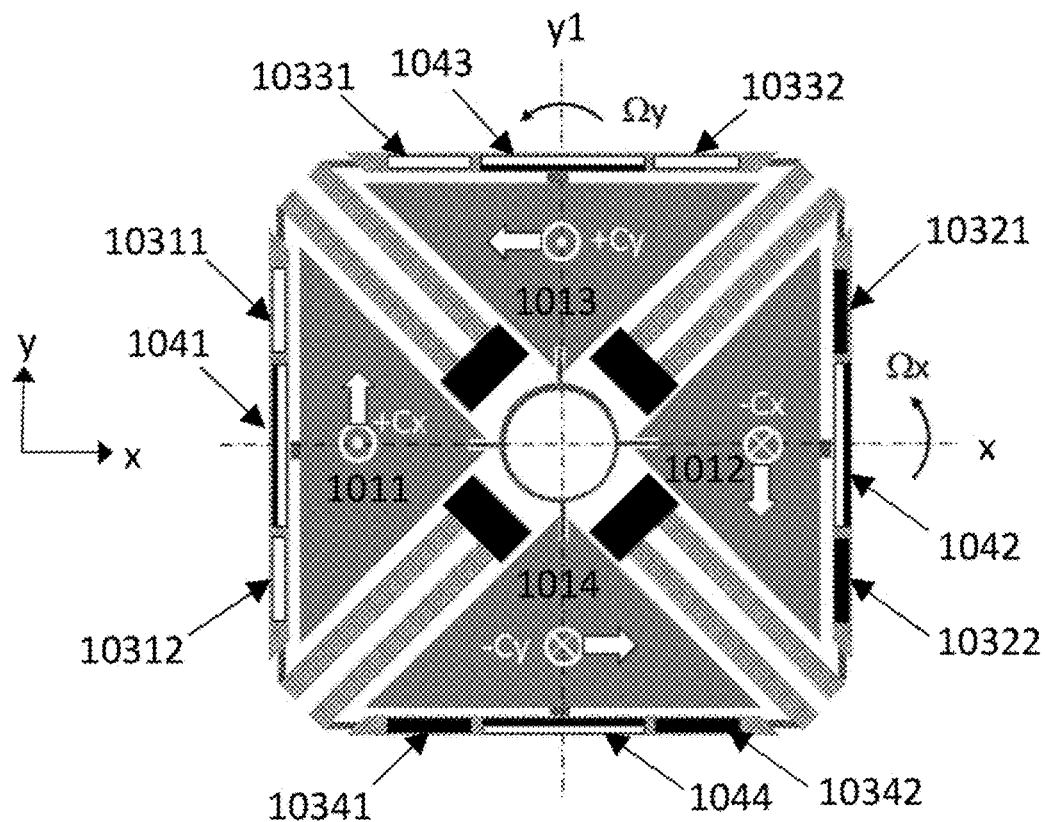

In order to include a measurement of the z-axis secondary mode in the gyroscope, additional transducers are needed. FIG. 10*c* illustrates an arrangement of piezoelectric transducers suitable for measuring the second mode as the z-axis secondary mode. In other words, the primary oscillation mode is in this case the first mode, as illustrated by the white arrows, and the z-axis secondary mode is the second mode, where the masses in each proof mass move in anti-phase linear translation toward and away from the gyroscope center point if the gyroscope undergoes angular rotation about the z1-axis.

Each peripheral suspender in the gyroscope illustrated in FIG. 10*c* comprises one in-plane transducer 1041-1044 and two out-of-plane transducers (10311+10312, 10321+10322, 10331+10332, 10341+10342) on its base. In the z-axis secondary mode, the in-plane transducers (1041, 1042, 1043, 1044) will bend at the middle, while the out-of-plane transducers (10311+10312, 10321+10322, 10331+10332, 10341+10342) will bend out of the device plane in either the x-axis secondary mode or the y-axis secondary mode. In-plane transducers may be arranged on the legs of each peripheral suspender in the same manner as in FIG. 10*a* to drive primary oscillation in the first mode. However, alternative arrangements are also possible, as explained in more detail with reference to FIG. 10*d* below.

Figure 10D:
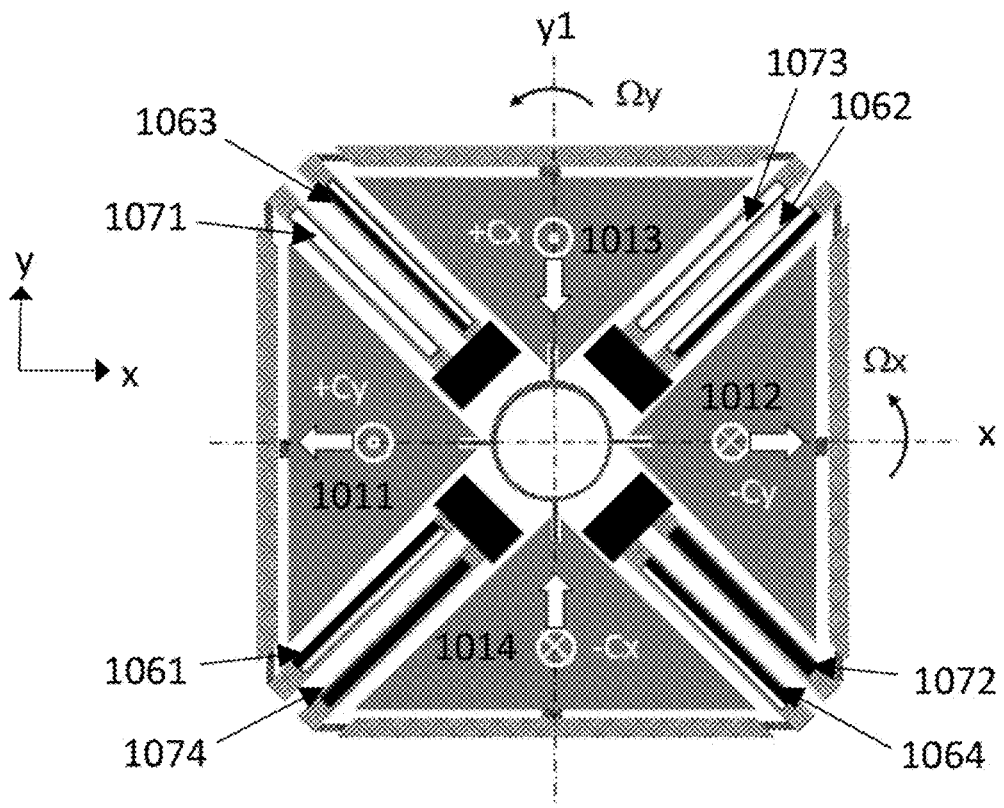

FIG. 10*d* illustrates an arrangement of piezoelectric transducers suitable for measuring the first mode as the z-axis secondary mode. In other words, the primary oscillation mode is in this case the second mode, as illustrated by the white arrows, and the z-axis secondary mode is the second mode, where the masses in the first proof mass pair and second proof mass pair oscillate around the z1-axis in anti-phase.

Each peripheral suspender in the gyroscope comprises an in-plane transducer 1061-1064 on one of its legs, and an out-of-plane transducer (1071-1074) on the other leg. In each proof mass pair, the out-of-plane transducer on the legs of the two peripheral suspenders have opposite polarity. In the z-axis secondary mode, the in-plane transducers 1061-1064 will undergo bending due to the rotation of the proof masses about the z-axis. In the y-axis secondary mode the out-of-plane transducers 1071-1072 will be bent as the proof mass pair 1011-1012 rotates about the y-axis, while in the x-axis secondary mode the out-of-plane transducers 1073-1074 will be bent as the proof mass pair 1013-1014 rotates about the x-axis.

In FIG. 10*d*, in-plane transducers may be arranged on the base of each peripheral suspender in the same manner as in FIG. 10*b* to drive primary oscillation in the second mode. However, it is also possible to combine the transducer arrangement on the base of each peripheral suspender in FIG. 10*c* with the transducer on each leg of the peripheral suspender illustrated in FIG. 10*d*. In that case, transducers 1041-1044 can be used to drive the primary oscillation and transducers 1061-1064 to sense the z1-axis primary mode, or vice versa. Transducers 10311+10312, 10321+10322, 10331+10332, 10341+10342 can correspondingly be used to sense the x-axis and y-axis secondary modes.

The same transducers can be paired with each other in more complicated combinations when the gyroscope comprises four proof mass pairs, as in FIGS. 6a and 6b.

The invention claimed is:

1. A microelectromechanical gyroscope which comprises first and second proof masses which form a first proof mass pair which in its rest position is aligned on an x-axis in the device plane, and third and fourth proof masses which form a second proof mass pair which in its rest position is aligned on a y1-axis in the device plane, so that the first and second proof mass pairs in their rest positions form an essentially symmetrical mass distribution in relation to a first center point where the x-axis crosses the y1-axis orthogonally, and where a vertical z1-axis crosses both the x-axis and the y1-axis orthogonally, and the gyroscope comprises a fixed support with one or more anchor points, one or more drive transducers and one or more sense transducers, and suspenders which suspend the first and second proof mass pairs from the one or more anchor points so that they allow the first and second proof mass pairs to oscillate in a primary oscillation mode initiated and sustained by the one or more drive transducers and in any of three secondary oscillation modes generated by the Coriolis effect, wherein the one or more sense transducers are configured to measure the magnitude of the three secondary oscillation modes, wherein the primary oscillation mode of the first and second proof mass pairs is one of a first mode and a second mode;

wherein the first mode comprises oscillation where the first proof mass pair moves in the device plane in a first rotational oscillation around the z1-axis, and the second proof mass pair simultaneously moves in the device plane in a second rotational oscillation around the z1-axis, so that the first proof mass pair and second proof mass pair oscillate around the z1-axis in anti-phase, always in opposite rotational directions, and wherein the second mode comprises oscillation where the first proof mass pair moves in the device plane in a first linear oscillation along the x-axis, so that both proof masses in the first proof mass pair move towards and away from the first center point simultaneously, and the second proof mass pair moves in the device plane in a second linear oscillation along the y1-axis, so that both proof masses in the second proof mass pair move towards and away from the first center point simultaneously, and where the first proof mass pair and second proof mass pair oscillate in anti-phase, so that the first proof mass pair moves towards the first center point when the second proof mass pair moves away from it and vice versa, and wherein the three secondary oscillation modes of the first and second proof mass pairs include a z-axis secondary mode, an x-axis secondary mode, and a y-axis secondary mode, so that in response to rotation of the gyroscope about the z-axis, the z-axis secondary mode is the second mode if the primary oscillation mode is the first mode, and the z-axis secondary mode is the first mode if the primary oscillation mode is the second mode, in response to rotation of the gyroscope about the x-axis, the x-axis secondary mode comprises oscillation where the first proof mass pair rotates out of the device plane about the y1-axis if the primary oscillation is the first mode, and the x-axis secondary mode comprises oscillation where the second proof mass pair rotates out of the device plane about the x-axis if the primary oscillation is the second mode, in response to rotation of the gyroscope about the y-axis, the y-axis secondary mode comprises oscillation where the second proof mass pair rotates out of the device plane about the x-axis if the primary oscillation is the first mode, and the y-axis secondary mode comprises oscillation where the first proof mass pair rotates out of the device plane about the y1-axis if the primary oscillation is the second mode, and wherein the oscillation of the first and second proof mass pairs is synchronized by a first synchronization element which comprises a first ringlike body centered around the first center point in the device plane, and first and second x-axis torsion bars which extend along the x-axis from the first ringlike body to the first and second proof masses which form the first proof mass pair, and first and second y-axis torsion bars which extend along the y1-axis from the first ringlike body to the third and fourth proof masses which form the second proof mass pair.

2. The microelectromechanical gyroscope according to claim 1, wherein the gyroscope further comprises fifth and sixth proof masses which form a third proof mass pair which in its rest position is aligned on the x-axis in the device plane, and seventh and eighth proof masses which form a fourth proof mass pair which in its rest position is aligned on a y2-axis in the device plane, so that the third and fourth proof mass pairs in their rest positions form an essentially symmetrical mass distribution in relation to a second center point, where the x-axis crosses the y2-axis orthogonally, and where a vertical z2-axis crosses both the x-axis and the y2-axis orthogonally, and the gyroscope comprises suspenders which suspend the third and fourth proof mass pairs from the one or more anchor points so that they allow the third and fourth proof mass pairs to oscillate in a primary oscillation mode initiated and sustained by the one or more drive transducers and in any of three secondary oscillation modes generated by the Coriolis effect, wherein the one or more sense transducers are configured to measure the magnitude of the three secondary oscillation modes, wherein the primary oscillation mode of the third and fourth proof mass pairs is the same as the primary oscillation mode of the first and second proof mass pairs, and wherein the three secondary oscillation modes of the third and fourth proof mass pairs include a z-axis secondary mode, an x-axis secondary mode, and a y-axis secondary mode, which correspond to the z-axis secondary mode, x-axis secondary mode and y-axis secondary mode, respectively, of the first and second proof mass pairs, wherein the oscillation of the third and fourth proof mass pairs is synchronized by a second synchronization element which comprises a second ringlike body centered around the second center point in the device plane, and third and fourth x-axis torsion bars which extend along the x-axis from the second ringlike body to the fifth and sixth proof masses which form the third proof mass pair, and third and fourth y-axis torsion bars which extend along the y2-axis from the second ring-like body to the seventh and eighth proof masses which form the fourth proof mass pair, and wherein a central synchronizing spring extends along the x-axis from the second proof mass in the first proof mass pair to the fifth proof mass in the third proof mass pair, so that the center of the central synchronizing spring is at a third center point where a y3-axis crosses the x-axis orthogonally, and the central synchronizing spring synchronizes the primary oscillation mode of the first and second proof mass pairs into anti-phase oscillation in relation to the primary oscillation mode of the third and fourth proof mass pairs, so that if the primary oscillation mode of the first, second, third and fourth proof mass pairs is the first mode, the second and third proof mass pairs always rotate in opposite rotational directions around the z1-axis and z2-axis, respectively, and so that if the primary oscillation mode of the first, second, third and fourth proof mass pairs is the second mode, the second and third proof mass pairs always oscillate in the same direction along the x-axis.

3. The microelectromechanical gyroscope according to claim 2, wherein the one or more anchor points comprises an upper anchor point aligned on the y3-axis, and a lower anchor point aligned on the y3-axis, so that the upper and lower anchor points lie on opposite sides of the third center point, and the gyroscope further comprises an upper synchronization element which is connected to the upper anchor point, the third proof mass and the seventh proof mass with torsion/flexure bars, and the gyroscope further comprises a lower synchronization element which is connected to the lower anchor point, the fourth proof mass and the eighth proof mass with torsion bars.

4. The microelectromechanical gyroscope according to claim 2, wherein the one or more anchor points comprises central anchor points located at the first and second center points.

5. The microelectromechanical gyroscope according to claim 4, wherein each synchronization element also comprises three or more curved suspenders in the device plane, which extend from the corresponding central anchor point to the corresponding ringlike body.

6. The microelectromechanical gyroscope according to claim 4, wherein each synchronization element also comprises a gimbal structure inside the corresponding ringlike body in the device plane, wherein the gimbal structure comprises a gimbal frame which is concentric with the corresponding ringlike body, two anchored torsion bars which extend from the central anchor point to the gimbal frame, wherein the two anchored torsion bars are oriented at an angle of 45° in relation to both the x-axis and the y-axis, and the gimbal structure also comprises two mobile torsion bars which extend from the gimbal frame to the corresponding ringlike body, wherein the two mobile torsion bars are orthogonal to the anchored torsion bars.

7. The microelectromechanical gyroscope according to claim 6, wherein the gimbal frame has the shape of a ring.

8. The microelectromechanical gyroscope according to claim 6, wherein the gimbal frame has a diamond shape.

9. The microelectromechanical gyroscope according to claim 4, wherein each of the synchronization elements also comprises a gimbal structure inside the corresponding ringlike body in the device plane, wherein the gimbal structure comprises an inner gimbal frame and an outer gimbal frame, both of which are concentric with the corresponding ringlike body, and two anchored torsion bars, both of which extend either along the x-axis or along the corresponding y-axis from the central anchor point to the inner gimbal frame, and the gimbal structure also comprises two inner mobile torsion bars which extend from the inner gimbal frame to the outer gimbal frame, wherein the two inner mobile torsion bars are orthogonal to the anchored torsion bars, and the gimbal structure further comprises four outer mobile torsion bars which extend from the outer gimbal frame to the corresponding ringlike body, wherein the four outer mobile torsion bars are oriented at an angle of 45° in relation to both the x-axis and the y-axis.

10. The microelectromechanical gyroscope according to claim 2, wherein each of the first and second synchronization elements is suspended from four diagonal anchor points, wherein each of the diagonal anchor points is located between proof masses from different proof mass pairs, so that there is one diagonal anchor point between all adjacent proof masses, and each synchronization element comprises four diagonal suspenders in the device plane, wherein each diagonal suspender extends from a diagonal anchor point to the corresponding ringlike body, and each diagonal suspender is oriented at an angle of 45° in relation to both the x-axis and the y-axis.

11. The microelectromechanical gyroscope according to claim 1, wherein the one or more drive transducers and the one or more sense transducers are piezoelectric force transducers.

12. The microelectromechanical gyroscope according to claim 1, wherein the one or more drive transducers and the one or more sense transducers are capacitive force transducers.

13. The microelectromechanical gyroscope according to claim 1, wherein the one or more peripheral anchor points comprise two anchor points on opposite sides of the central corner of each proof mass, and each proof mass is suspended from said peripheral anchor points by a peripheral suspender which has the shape of a truncated isosceles triangle which partially surrounds the proof mass, so that a first leg of the peripheral suspender extends from one peripheral anchor point past a first side of the proof mass to a first corner point on the additional peripheral suspender, and a second leg of the peripheral suspender extends from the other peripheral anchor point past a second side of the corresponding proof mass to a second corner point on the peripheral suspender, and the base of the peripheral suspender, which joins together the first leg and the second leg, extends from the first corner point to the second corner point past a third side of the corresponding proof mass, and the base of the peripheral suspender is attached to the third side of the corresponding proof mass with a connector aligned on the same axis as the proof mass.

* * * * *